US012487399B2

(12) United States Patent
Zhou et al.

(10) Patent No.: US 12,487,399 B2
(45) Date of Patent: Dec. 2, 2025

(54) OPTICAL WAVEGUIDE STRUCTURE AND MANUFACTURING METHOD, OPTICAL WAVEGUIDE MODULE, OPTICAL SWITCHING DEVICE, AND SYSTEM

(71) Applicant: Huawei Technologies Co., Ltd., Shenzhen (CN)

(72) Inventors: Min Zhou, Dongguan (CN); Zhenqing Zhao, Dongguan (CN); Chun Sun, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 362 days.

(21) Appl. No.: 18/148,879

(22) Filed: Dec. 30, 2022

(65) Prior Publication Data

US 2023/0152516 A1    May 18, 2023

Related U.S. Application Data

(63) Continuation of application No. PCT/CN2021/100734, filed on Jun. 17, 2021.

(30) Foreign Application Priority Data

Jul. 3, 2020   (CN) .......................... 202010637223.4

(51) Int. Cl.
    *G02B 6/13*     (2006.01)
    *G02B 6/12*     (2006.01)

(52) U.S. Cl.
    CPC ........... *G02B 6/12007* (2013.01); *G02B 6/13* (2013.01); *G02B 2006/12145* (2013.01)

(58) Field of Classification Search
None
See application file for complete search history.

(56) References Cited

U.S. PATENT DOCUMENTS 5,039,189 A * 8/1991 Lytel ..................... G02F 1/3132
    385/48
5,206,920 A * 4/1993 Cremer .............. G02B 6/12007
    385/47
(Continued)

FOREIGN PATENT DOCUMENTS

CN      2500036 Y      7/2002
CN      2611937 Y      4/2004
(Continued)

OTHER PUBLICATIONS

Tetsuzo Yoshimura, et al, "3D Micro Optical Switching System (3D-MOSS) Architecture", Jun. 7, 2002 (Jun. 7, 2002), total 9 pages.
(Continued)

*Primary Examiner* — Kaveh C Kianni
(74) *Attorney, Agent, or Firm* — Slater Matsil, LLP

(57) ABSTRACT

An optical waveguide structure and a manufacturing method, an optical waveguide module, an optical switching device, and an optical waveguide system are provided, and belong to the field of optical communication. The optical waveguide structure includes: at least two optical waveguides disposed in a stacked manner, where a first optical waveguide channel is disposed between two optical waveguides located at different layers in the at least two optical waveguides, and two ends of the first optical waveguide channel are physically connected to the two optical waveguides.

20 Claims, 25 Drawing Sheets

(56) References Cited

U.S. PATENT DOCUMENTS

| | | | | |
|---|---|---|---|---|
| 5,371,817 A * | 12/1994 | Revelli, Jr | | H04N 1/036 |
| | | | | 385/44 |
| 5,917,980 A * | 6/1999 | Yoshimura | | G02F 1/065 |
| | | | | 385/132 |
| 6,823,103 B2 * | 11/2004 | Lam | | G02B 6/12016 |
| | | | | 385/24 |
| 7,397,989 B2 * | 7/2008 | Maki | | G02F 1/0316 |
| | | | | 385/16 |
| 8,885,991 B2 * | 11/2014 | Ty Tan | | G02B 6/3596 |
| | | | | 385/16 |
| 10,802,269 B2 * | 10/2020 | Sato | | G02B 6/30 |
| 11,422,322 B2 * | 8/2022 | Davenport | | G02B 6/4204 |
| 2004/0033004 A1 * | 2/2004 | Welch | | H01S 5/22 |
| | | | | 385/14 |
| 2004/0247236 A1 * | 12/2004 | Yoshimura | | G02B 6/12004 |
| | | | | 385/16 |
| 2005/0047708 A1 * | 3/2005 | Ma | | G02B 6/125 |
| | | | | 385/14 |
| 2005/0111781 A1 * | 5/2005 | Jain | | G02B 6/43 |
| | | | | 385/47 |
| 2013/0044979 A1 * | 2/2013 | Budd | | G02B 6/38 |
| | | | | 385/59 |

FOREIGN PATENT DOCUMENTS

| | | |
|---|---|---|
| CN | 108061937 A | 5/2018 |
| CN | 110568560 A | 12/2019 |
| CN | 112925057 A | 6/2021 |

OTHER PUBLICATIONS

Tetsuzo Yoshimura, "Three-dimensional micro-optical switching system architecture using slab-waveguide-based micro-optical switches", Feb. 2003, (Feb. 28, 2003), total 8 pages.

Keijiro Suzuki et al, "O-Band Strictly Non-Blocking 8 8 Silicon-Photonics Switch", OFC2020 Th3B.4, Optical Fiber Communication Conference 2020, San Diego, California United States, Mar. 8-12, 2020, total 3 pages.

* cited by examiner

A to B: 111
A to C: 110
A to D: 000

E to F: 11001
E to G: 01011

OPTICAL WAVEGUIDE STRUCTURE AND MANUFACTURING METHOD, OPTICAL WAVEGUIDE MODULE, OPTICAL SWITCHING DEVICE, AND SYSTEM

CROSS-REFERENCE TO RELATED APPLICATIONS

This application is a continuation of International Application No. PCT/CN2021/100734, filed on Jun. 17, 2021, which claims priority to Chinese Patent Application No. 202010637223.4, filed on Jul. 3, 2020. The disclosures of the aforementioned applications are hereby incorporated by reference in their entireties.

TECHNICAL FIELD

This application relates to the field of optical communication, and in particular, to an optical waveguide structure and a manufacturing method, an optical waveguide module, an optical switching device, and a system.

BACKGROUND

An optical waveguide is a dielectric apparatus that guides light waves to propagate in the optical waveguide, and is also referred to as a dielectric optical waveguide.

Currently, an optical waveguide structure based on a waveguide optical switching technology is proposed. The optical waveguide structure includes optical waveguides and at least two optical switches arranged in a matrix. Each optical switch has four ports, and the four ports are cross-connected in an "X" shape in a form of 2×2. Therefore, the optical switch is also referred to as a cross optical switch. The four ports of each optical switch are connected to a port of another optical switch, an input port or output port of the optical waveguide structure through the optical waveguide. In this way, a plurality of optical waveguide crossings can be generated on a plane on which at least two optical waveguides are located. The optical waveguide structure is referred to as a co-layer cross optical waveguide. By using the co-layer cross optical waveguide, multiple-input ports and multiple-output port optical waveguide communication is implemented, to improve integration of the optical waveguide structure.

However, in the foregoing optical waveguide structure, optical signal transmission between different optical waveguides is implemented by using the co-layer cross optical waveguide, and crosstalk between the optical waveguides is introduced by the crossing of the optical waveguides, resulting in a large insertion loss of the optical waveguide structure.

SUMMARY

Embodiments of this application provide an optical waveguide structure and a manufacturing method, an optical waveguide module, an optical switching device, and a system. The technical solution is as follows:

In one aspect, an optical waveguide structure is provided, including: at least two optical waveguides disposed in a stacked manner, where the at least two optical waveguides include a first optical waveguide and a second optical waveguide, and the first optical waveguide and the second optical waveguide are located at different layers; and a first optical waveguide channel disposed between the first optical waveguide and the second optical waveguide, where two ends of the first optical waveguide channel are physically connected to the first optical waveguide and the second optical waveguide.

According to the optical waveguide structure provided in this embodiment of this application, the first optical waveguide channel is physically connected to two optical waveguides located at different layers, to implement optical signal transmission between different optical waveguides, so that fewer co-layer cross optical waveguides are used, and crossing of optical waveguides at a same layer is reduced. Therefore, a transmission insertion loss of an optical signal is reduced, and transmission quality of an optical signal is improved. In addition, because the optical waveguides of the optical waveguide structure are disposed in a stacked manner, and are no longer limited to be on one plane, integration of the optical waveguide structure can be effectively ensured, and miniaturization of the optical waveguide structure is implemented.

In this embodiment of this application, the first optical waveguide and the second optical waveguide are physically connected through the first optical waveguide channel, and do not transmit an optical signal through an evanescent field. The first optical waveguide channel is a physical channel, and the first optical waveguide channel implements optical signal transmission between the first optical waveguide and the second optical waveguide through total reflection.

Optionally, a dielectric layer is disposed between the first optical waveguide and the second optical waveguide in a stacking direction of the first optical waveguide and the second optical waveguide, the first optical waveguide channel is located at the dielectric layer, and a refractive index of the dielectric layer is less than a refractive index of the first optical waveguide channel. In this way, an optical signal is effectively transmitted in the first optical waveguide and the second optical waveguide. Optionally, a difference between the refractive index of the first optical waveguide channel and a refractive index of the first optical waveguide ranges from 0.5% to 50%, and/or a difference between the refractive index of the first optical waveguide channel and a refractive index of the second optical waveguide ranges from 0.5% to 50%. This facilitates transmission of an optical signal between the first optical waveguide and the second optical waveguide through the first optical waveguide channel, and reduces a transmission insertion loss of the optical signal.

In this embodiment of this application, the first optical waveguide channel is a channel formed by performing ion doping on the dielectric layer. The optical waveguide structure is a hardware product having a physical structure. For example, the optical waveguide structure may be an optical chip. The first optical waveguide channel implements optical signal transmission between the first optical waveguide and the second optical waveguide through total reflection.

In an optional example, the first optical waveguide is located at an upper layer of the second optical waveguide. The optical waveguide structure further includes an optical switch connected to the first optical waveguide, where the optical switch is configured to perform routing of an optical signal, so that the optical signal is transmitted along the first optical waveguide or transmitted along the second optical waveguide. The optical switch is connected to the first optical waveguide located at the upper layer, to facilitate manufacture of the optical switch.

In an optional example, the optical waveguide structure includes at least two optical switches, a quantity of optical switches connected to the first optical waveguide is the same as a quantity of first optical waveguide channels connected to the first optical waveguide, and the first optical waveguide channels connected to the first optical waveguide and the optical switches on the first optical waveguide are alternately arranged one by one. For example, the optical waveguide structure includes at least two second optical waveguides, and a quantity of second optical waveguides is the same as the quantity of first optical waveguide channels. Optionally, the optical switch is a waveguide type optical switch, and is a 1×2 optical switch. In this way, routing on two paths can be implemented by using the optical switch.

For example, in the stacking direction of the first optical waveguide and the second optical wave, projections of a first region of the first optical waveguide and a second region of the second optical waveguide overlap on a plane parallel to the first optical waveguide and the second optical waveguide, and the first optical waveguide channel connects the first region and the second region. That is, an orthogonal projection of one of the two optical waveguides on the other optical waveguide in the stacking direction of the two optical waveguides overlaps the other optical waveguide in an overlapping region, and an orthogonal projection of the first optical waveguide channel on the other optical waveguide in the stacking direction of the two optical waveguides is located in the overlapping region. In this way, the first optical waveguide channel is located within an overlapping range of the first optical waveguide and the second optical waveguide in the stacking direction. When performing ion doping through the dielectric layer, an ion gun can form the first optical waveguide channel without using a large tilt angle. This reduces complexity of a manufacturing process.

In an optional implementation, the at least two optical waveguides further include a third optical waveguide. The third optical waveguide, the first optical waveguide, and the second optical waveguide each are located at a different layer. A second optical waveguide channel is disposed between the third optical waveguide and the second optical waveguide, and two ends of the second optical waveguide channel between the third optical waveguide and the second optical waveguide are physically connected to the second optical waveguide and the third optical waveguide. The third optical waveguide and the second optical waveguide channel physically connected to the second optical waveguide and the third optical waveguide are disposed, so that an optical signal can be transmitted at more layers.

In an optional implementation, a thickness of a gap between the first optical waveguide and the second optical waveguide ranges from 500 nm to 5 µm. This facilitates manufacturing of the first optical waveguide channel. Optionally, a length or a width of a cross section of the first optical waveguide channel ranges from 500 nm to 5 µm, and the cross section is perpendicular to the stacking direction of the first optical waveguide and the second optical waveguide. This facilitates manufacturing of the first optical waveguide channel.

In an optional implementation, an angle formed between an extension direction of the first optical waveguide channel and a plane on which any connected optical waveguide is located ranges from 45° to 135°. This facilitates manufacturing of the first optical waveguide channel, and also implements effective total reflection of an optical signal in the first optical waveguide channel.

According to a second aspect, an optical waveguide module is provided. For example, the optical waveguide module may be one optical chip or a set of a plurality of optical chips. The optical waveguide module includes a multiplexer/demultiplexer module, a first tributary wave add/drop structure, a connector, and at least two optical waveguide structures. The optical waveguide structure may be the optical waveguide structure according to the first aspect.

Each optical waveguide structure includes at least two optical waveguides disposed in a stacked manner, the at least two optical waveguides include a first optical waveguide and a second optical waveguide, the first optical waveguide and the second optical waveguide are located at different layers, a first optical waveguide channel is disposed between the first optical waveguide and the second optical waveguide, and two ends of the first optical waveguide channel are physically connected to the first optical waveguide and the second optical waveguide. The multiplexer/demultiplexer module has a line port and at least two first optical waveguide connection ports, and the at least two first optical waveguide connection ports of the multiplexer/demultiplexer module are one-to-one connected to first ends of first optical waveguides of the at least two optical waveguide structures. The first tributary wave add/drop structure has a first tributary port and at least two second optical waveguide connection ports, the at least two second optical waveguide connection ports of the first tributary wave add/drop structure are one-to-one connected to second ends of the first optical waveguides of the at least two optical waveguide structures, and the first tributary port is configured to upload or download an optical signal. The connector has a line pass-through port and at least two third optical waveguide connection ports, the at least two third optical waveguide connection ports of the connector each are connected to a second end of a second optical waveguide of each of the at least two optical waveguide structures, and the line pass-through port is configured to be connected to a line pass-through port of another optical waveguide module. In the optical waveguide module, a quantity of first optical waveguide connection ports, a quantity of second optical waveguide connection ports, and a quantity of third optical waveguide connection ports are all the same as a quantity of optical waveguide structures.

According to the optical waveguide module provided in this embodiment of this application, in the optical waveguide structure, the first optical waveguide channel is physically connected to two optical waveguides located at different layers, to implement direct-jump transmission of an optical signal between different optical waveguides, so that fewer co-layer cross optical waveguides are used, and crossing of optical waveguides at a same layer is reduced. Therefore, a transmission insertion loss of an optical signal is reduced, and transmission quality of an optical signal is improved. In addition, because the optical waveguides of the optical waveguide structure are disposed in a stacked manner, and are no longer limited to be on one plane, integration of the optical waveguide module can be effectively ensured, and miniaturization of the optical waveguide module is implemented. On this basis, the connector can implement pass-through of a line-wavelength optical signal of a connector of another optical waveguide module through the line pass-through port, to implement a line wavelength pass-through function of an optical switching device. The first tributary wave add/drop structure can upload a local-wavelength optical signal or download a line-wavelength optical signal through a tributary port. In this way, basic functions of the optical switching device can be implemented.

Optionally, each optical waveguide structure further includes n fourth optical waveguides, the fourth optical waveguide and the first optical waveguide are located at different layers, a third optical waveguide channel is disposed between the first optical waveguide and each fourth optical waveguide, one end of the third optical waveguide channel is connected to the first optical waveguide, the other end is connected to a first end of the fourth optical waveguide, and n is a positive integer. The n fourth optical waveguides are located at the same layer, to facilitate manufacturing of the n fourth optical waveguides.

In an optional example, the optical waveguide module further includes m second tributary wave add/drop structures, the second tributary wave add/drop structure has a second tributary port and a fourth optical waveguide connection port, the fourth optical waveguide connection ports of the m second tributary wave add/drop structures each are connected to a second end of a fourth optical waveguide of each of the at least two optical waveguide structures, and the second tributary port is configured to upload or download an optical signal. In the optical waveguide module, a quantity of fourth optical waveguide connection ports is the same as the quantity of optical waveguide structures. For example, m=n.

In an optional implementation, in each optical waveguide structure, an extension direction of the first optical waveguide is perpendicular to an extension direction of the second optical waveguide, and is parallel to extension directions of the n fourth optical waveguides. In another optional implementation, the connector is a multi-core connector, a multiplexer/demultiplexer module, a multiple-fiber push-on/pull-off interface configured to connect to an optical cable, or an optical fiber ferrule configured to connect to an optical fiber array.

In an example, the first tributary wave add/drop structure and/or the second tributary wave add/drop structure is a multiplexer/demultiplexer module. In another example, either of the first tributary wave add/drop structure and the second tributary wave add/drop structure is a cascaded optical switch structure having $2^N$ first ports and one second port, where N is a positive integer. The tributary wave add/drop structure is configured to: after receiving a logic control instruction, control, based on the logic control instruction, the second port to connect to one of the $2^N$ first ports, and disconnect from another first port. With this tributary wave add/drop structure, wave add/drop of an optical signal can be controlled by the logic control instruction, and manufacturing costs of the optical waveguide module are further reduced. Optionally, the logic control instruction includes N bits. The N bits occupy less memory space and have fewer communication overheads.

According to a third aspect, an optical switching device is provided, including: a communication structure, including two optical waveguide modules according to the second aspect. The two optical waveguide modules are connected through respective line pass-through ports, and the line ports of the two optical waveguide modules each are connected to a line in a different direction. Optionally, the optical switching device includes two communication structures, and optical signal transmission directions of lines connected to line ports of the two communication structures are opposite.

According to the optical switching device provided in this embodiment of this application, two optical waveguides located at different layers are physically connected to a first optical waveguide channel, and therefore, an insertion loss is effectively reduced compared with that in an FOADM and WSS. In addition, one optical waveguide module in each communication structure can input a line-wavelength optical signal through a multiplexer/demultiplexer module, and output, through a line pass-through port, the line-wavelength optical signal passing through another optical waveguide module. The another optical waveguide module inputs the line-wavelength optical signal through a line pass-through port, and outputs the line-wavelength optical signal through a multiplexer/demultiplexer module, to implement transmission of the line-wavelength optical signal in one direction. In addition, a tributary port of each optical waveguide module in the communication structure also supports uploading of a local-wavelength optical signal or downloading of a line-wavelength optical signal. Further, an optical switch is disposed in the optical waveguide module. For example, each optical waveguide structure includes at least one optical switch, routing of an optical signal is implemented without calibrating a wavelength corresponding to the tributary port, and colorless wave add/drop is implemented. When the optical switching device includes two communication structures, transmission of a line-wavelength optical signal in two directions can be implemented. In this way, all functions of the optical switching device can be implemented through a simple structure.

According to a fourth aspect, an optical waveguide system is provided, including: at least two optical switching devices according to the third aspect. The at least two optical switching devices are connected through an optical fiber.

According to the optical waveguide system provided in this embodiment of this application, in the optical switching device, two optical waveguides located at different layers are physically connected to a first optical waveguide channel, and therefore, an insertion loss is effectively reduced compared with that in an FOADM and WSS. In addition, each optical switching device implements colorless wave add/drop, and applicability of the optical switching device is high. This implements normalization of devices and reduces storage costs.

According to a fifth aspect, a method for manufacturing an optical waveguide structure is provided, and is used to manufacture the optical waveguide structure according to the first aspect. The method includes: forming a first optical waveguide channel between a first optical waveguide and a second optical waveguide that are located at different layers in at least two optical waveguides, where two ends of the first optical waveguide channel are physically connected to the first optical waveguide and the second optical waveguide.

According to the method for manufacturing an optical waveguide structure provided in this embodiment of this application, the first optical waveguide channel is physically connected to two optical waveguides located at different layers, to implement optical signal transmission between different optical waveguides, so that fewer co-layer cross optical waveguides are used, and crossing of optical waveguides at a same layer is reduced. Therefore, a transmission insertion loss of an optical signal is reduced, and transmission quality of an optical signal is improved. In addition, because the optical waveguides of the optical waveguide structure are disposed in a stacked manner, and are no longer limited to be on one plane, integration of the optical waveguide structure can be effectively ensured, and miniaturization of the optical waveguide structure is implemented.

Optionally, the method further includes: forming a dielectric layer after each optical waveguide layer is formed on the substrate, where the first optical waveguide channel between the two optical waveguides is located at a dielectric layer between the two optical waveguides, and a refractive index of the dielectric layer is less than a refractive index of the first optical waveguide channel.

Optionally, the forming a first optical waveguide channel between a first optical waveguide and a second optical waveguide that are located at different layers in the at least two optical waveguides includes: forming the first optical waveguide channel by performing ion doping on the dielectric layer between the first optical waveguide and the second optical waveguide.

In an optional implementation, the first optical waveguide is farther from the substrate than the second optical waveguide. The process of forming the first optical waveguide channel by performing ion doping on the dielectric layer between the first optical waveguide and the second optical waveguide includes: after forming the first optical waveguide, disposing a mask plate on a surface that is of the first optical waveguide and that is away from the substrate, where the mask plate has a hollow region; and performing ion doping on the dielectric layer between the first optical waveguide and the second optical waveguide through a portion of the first optical waveguide exposed from the hollow region of the mask plate, to form the first optical waveguide channel between the first optical waveguide and the second optical waveguide.

In another optional implementation, the first optical waveguide is farther from the substrate than the second optical waveguide. The process of forming the first optical waveguide channel by performing ion doping on the dielectric layer between the first optical waveguide and the second optical waveguide includes: after forming the first optical waveguide, disposing a mask plate on a surface that is of the substrate and that is away from the second optical waveguide, where the mask plate has a hollow region; and performing ion doping on the dielectric layer between the first optical waveguide and the second optical waveguide through a portion of the substrate exposed from the hollow region of the mask plate, to form the first optical waveguide channel between the first optical waveguide and the second optical waveguide.

Optionally, the method further includes: forming an optical switch connected to the first optical waveguide on the substrate.

According to a sixth aspect, a tributary wave add/drop structure is provided. The tributary wave add/drop structure is a cascaded optical switch structure having $2^N$ first ports and one second port, where N is a positive integer. The tributary wave add/drop structure is configured to: after receiving a logic control instruction, control, based on the logic control instruction, the second port to connect to one of the $2^N$ first ports, and disconnect from another first port. With this tributary wave add/drop structure, wave add/drop of an optical signal can be controlled by the logic control instruction, and manufacturing costs of an optical waveguide module are further reduced. Optionally, the logic control instruction includes N bits. The N bits occupy less memory space and have fewer communication overheads. For example, the tributary wave add/drop structure may be applied to an optical waveguide module.

According to a waveguide channel provided in this embodiment of this application, a first optical waveguide and a second optical waveguide located at different layers are physically connected to a first optical waveguide channel, and therefore, an insertion loss is effectively reduced compared with that in an FOADM and WSS. In addition, the optical waveguide module inputs a line-wavelength optical signal through a multiplexer/demultiplexer module, and outputs, through a line pass-through port, a line-wavelength optical signal passing through another optical waveguide module (or receives, through the line pass-through port, the line-wavelength optical signal passing through the another optical waveguide module, and outputs the line-wavelength optical signal through the multiplexer/demultiplexer module). A first tributary wave add/drop structure can upload a local-wavelength optical signal or download the line-wavelength optical signal, so that transmission of the line-wavelength optical signal in one direction can be implemented. Further, the optical switch is disposed in the optical waveguide module. For example, each optical waveguide structure includes at least one optical switch, routing of an optical signal is implemented without calibrating a wavelength corresponding to the tributary port, and colorless wave add/drop is implemented.

Optical signals of a group of wavelengths input from a line port in the optical waveguide module may be separated by the multiplexer/demultiplexer module, and an optical signal of a line pass-through wavelength may be output through a connector, or an optical signal of a tributary wavelength may be output through a first tributary wave add/drop structure or a second tributary wave add/drop structure. A wavelength in the entire optical waveguide module does not need to be calibrated, and colorless wavelength pass-through and local downloading can be implemented through a simple structure. When the optical switching device includes two communication structures, transmission of a line-wavelength optical signal in two directions can be implemented. In this way, all functions of the optical switching device can be implemented through a simple structure.

DETAILED DESCRIPTION OF ILLUSTRATIVE EMBODIMENTS

To make principles and technical solutions of this application clearer, the following further describes in detail implementations of this application with reference to the accompanying drawings.

Figure 1:
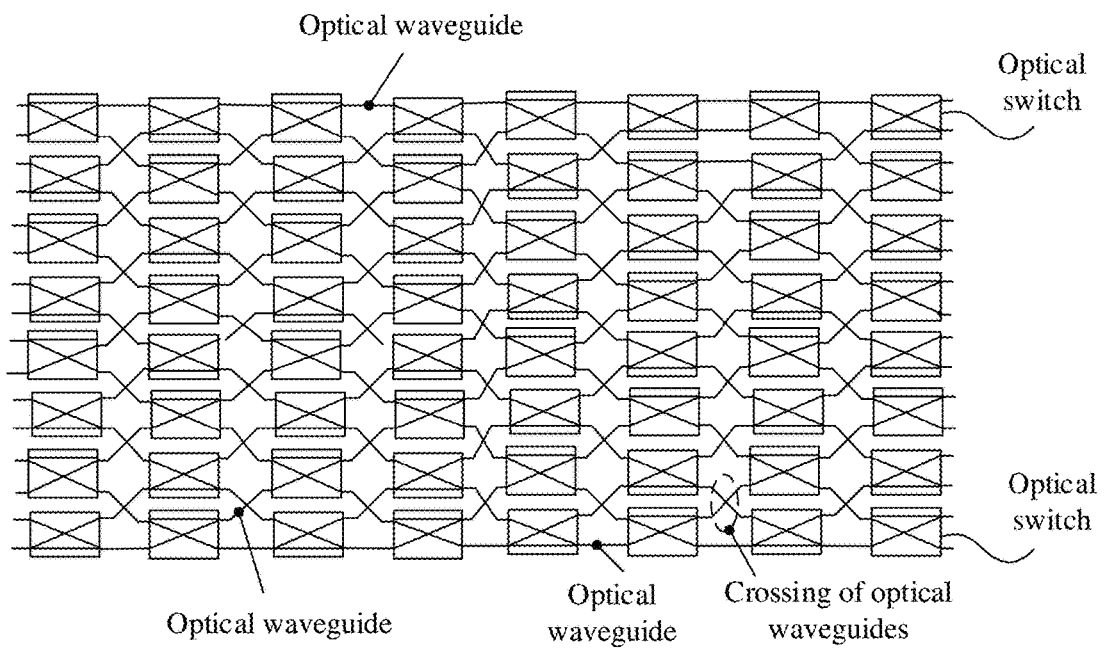
FIG. 1 is a schematic diagram of a structure of illustrative co-layer cross optical waveguides according to the related technology.

With the development of optical communication technology, the research of optical waveguide has become an important topic in the field of optical communication. A conventional optical waveguide is mainly a planar lightwave waveguide (PLC), that is, the optical waveguide is located on a plane. Based on this, an optical waveguide structure based on a waveguide optical switching technology is currently proposed. FIG. 1 is a schematic diagram of an optical waveguide structure. The optical waveguide structure includes optical waveguides and at least two optical switches arranged in a matrix. The optical waveguide structure implements, through the at least two optical switches and at least two crossed optical waveguides, optical signal transmission between different optical waveguides located on a same plane, and is referred to as a co-layer cross optical waveguide. However, the optical signal transmission between different optical waveguides is implemented by using the co-layer cross optical waveguides, and crosstalk between the optical waveguides is introduced by crossing of the optical waveguides, resulting in a large insertion loss of the optical waveguide structure.

Figure 2:
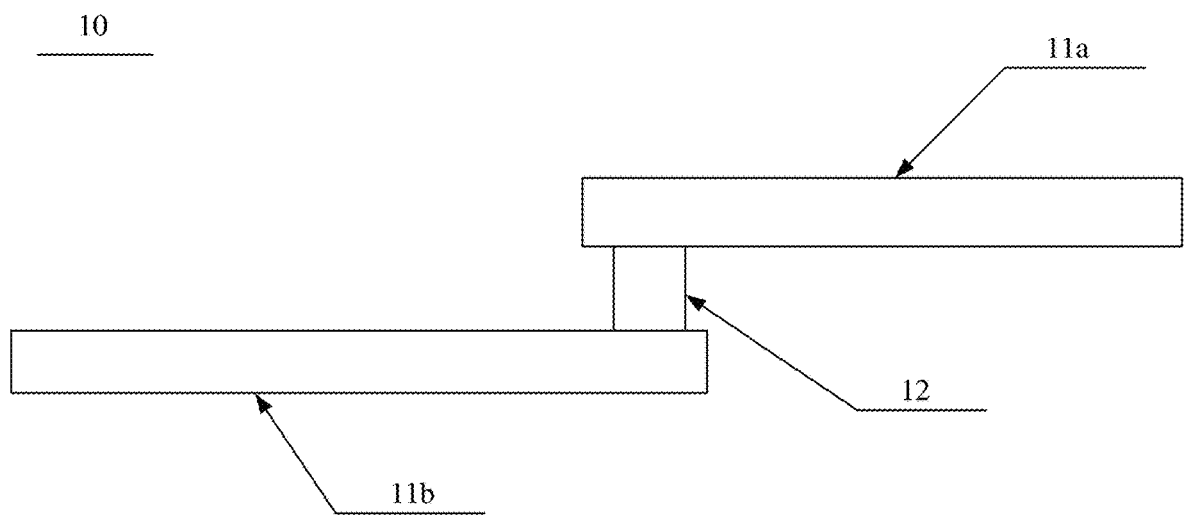
FIG. 2 is a schematic diagram of an optical waveguide structure according to an illustrative embodiment of this application.

Embodiments of this application provide an optical waveguide structure 10, to effectively reduce an insertion loss of the optical waveguide structure. FIG. 2 is a schematic diagram of an optical waveguide structure according to an exemplary embodiment of this application. As shown in FIG. 2, the optical waveguide structure includes at least two optical waveguides disposed in a stacked manner. The at least two optical waveguides include a first optical waveguide 11a and a second optical waveguide 11b. The first optical waveguide 11a and the second optical waveguide 11b are located at different layers. A first optical waveguide channel 12 is disposed between the first optical waveguide 11a and the second optical waveguide 11b, and two ends of the first optical waveguide channel 12 are physically connected to the first optical waveguide 11a and the second optical waveguide 11b. That the first optical waveguide 11a and the second optical waveguide 11b are located at different layers means that a plane (the plane is a manufacturing plane of the optical waveguide) on which the first optical waveguide 11a is located and a plane on which the second optical waveguide 11b is located are not coplanar, and the plane on which the first optical waveguide 11a is located is usually parallel to the plane on which the second optical waveguide 11b is located. If the first optical waveguide 11a and the second optical waveguide 11b are manufactured on a substrate, a distance between the first optical waveguide 11a and the substrate is different from a distance between the second optical waveguide 11b and the substrate.

As shown in FIG. 2, the physical connection in embodiments of this application may be understood as a physical connection formed between two optical waveguides through the first optical waveguide channel. That is, the two ends of the first optical waveguide channel are directly connected to the two optical waveguides. The first optical waveguide channel 12 serves as a bridge between the first optical waveguide 11a and the second optical waveguide 11b, and implements a physical connection between the first optical waveguide 11a and the second optical waveguide 11b, so that cross-layer transmission of an optical signal is implemented between the first optical waveguide 11a and the second optical waveguide 11b. That is, an optical signal transmitted on the first optical waveguide 11a can be transmitted to the second optical waveguide 11b along the first optical waveguide channel 12, and an optical signal transmitted on the second optical waveguide 11b can also be transmitted along the first optical waveguide channel 12 to the first optical waveguide 11a. The first optical waveguide channel 12 may also be referred to as a bridge optical waveguide channel. In embodiments of this application, a transmission insertion loss of an optical signal in the first optical waveguide channel is close to a transmission insertion loss of the optical signal in a common optical waveguide.

According to the optical waveguide structure provided in this embodiment of this application, the first optical waveguide channel is physically connected to two optical waveguides located at different layers, to implement optical signal transmission between different optical waveguides, so that fewer co-layer cross optical waveguides are used, and crossing of optical waveguides at a same layer is reduced. Therefore, a transmission insertion loss of an optical signal is reduced, and transmission quality of an optical signal is improved. In addition, because the optical waveguides of the optical waveguide structure are disposed in a stacked manner, and are no longer limited to be on one plane, integration of the optical waveguide structure can be effectively ensured, and miniaturization of the optical waveguide structure is implemented.

In the related technology, different optical waveguides may transmit an optical signal through an evanescent field. An evanescent field is also referred to as an evanescent wave. The evanescent field is an electromagnetic wave generated at the interface between two different mediums due to mutual coupling, and amplitude of the evanescent field decreases with an increase of a depth perpendicular to the interface. In this embodiment of this application, the first optical waveguide 11a and the second optical waveguide 11b are physically connected through the first optical waveguide channel 12 in FIG. 2, and do not transmit an optical signal through an evanescent field. The first optical waveguide channel 12 is a physical channel, and the first optical waveguide channel 12 transmits an optical signal between the connected first optical waveguide 11a and the connected second optical waveguide 11b through total reflection in the first optical waveguide channel.

Figure 3A:
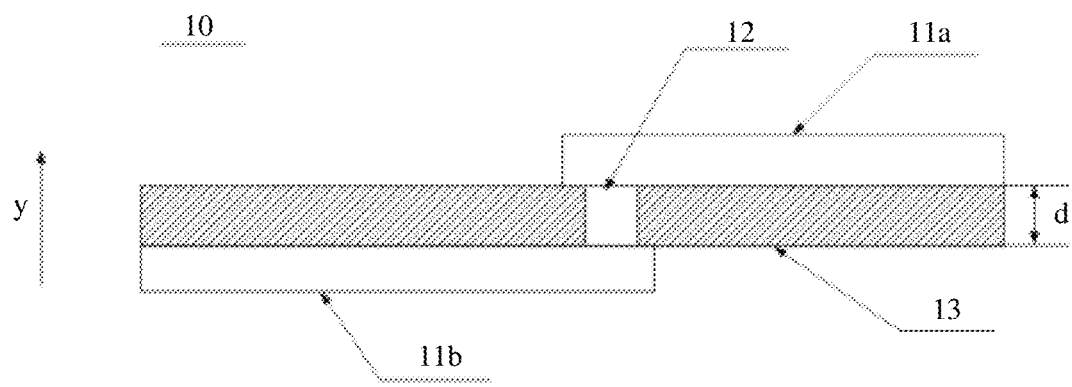
FIG. 3A is a schematic diagram of another optical waveguide structure according to an illustrative embodiment of this application.

FIG. 3A is a schematic diagram of another optical waveguide structure according to an illustrative embodiment of this application. As shown in FIG. 3A, in a stacking direction y of the first optical waveguide 11a and the second optical waveguide 11b (that is, the stacking direction of the first optical waveguide 11a and the second optical waveguide 11b, which is usually perpendicular to the plane on which the first optical waveguide 11a or the second optical waveguide 11b is located), a dielectric layer 13 is disposed between the first optical waveguide 11a and the second optical waveguide 11b. The first optical waveguide channel 12 is located at the dielectric layer 13, and a refractive index of the dielectric layer 13 is less than a refractive index of the first optical waveguide channel 12, so that the total reflection of an optical signal in the first optical waveguide channel 12 is implemented. According to this embodiment of this application, during actual implementation, the refractive index of the dielectric layer 13 is also less than those of the first optical waveguide 11a and the second optical waveguide 11b, so that an optical signal is effectively transmitted in the first optical waveguide 11a and the second optical waveguide 11b. In this embodiment of this application, a difference between the refractive index of the first optical waveguide channel and the refractive index of the first optical waveguide ranges from 0.5% to 50%, and/or a difference between the refractive index of the first optical waveguide channel and the refractive index of the second optical waveguide ranges from 0.5% to 50%. A refractive index or a refractive index difference may be expressed as a ratio of the refractive index or the refractive index difference to a vacuum refractive index 1, and therefore may be expressed as a percentage. This facilitates transmission of an optical signal between the first optical waveguide and the second optical waveguide through the first optical waveguide channel, and reduces a transmission insertion loss of the optical signal. As shown in FIG. 3A, a thickness of a gap d between the two optical waveguides ranges from 500 nm (nanometers) to 5 μm (microns). Then, a thickness of the dielectric layer 13 ranges from 500 nm to 5 μm. This facilitates manufacturing of the first optical waveguide channel.

Figure 3B:
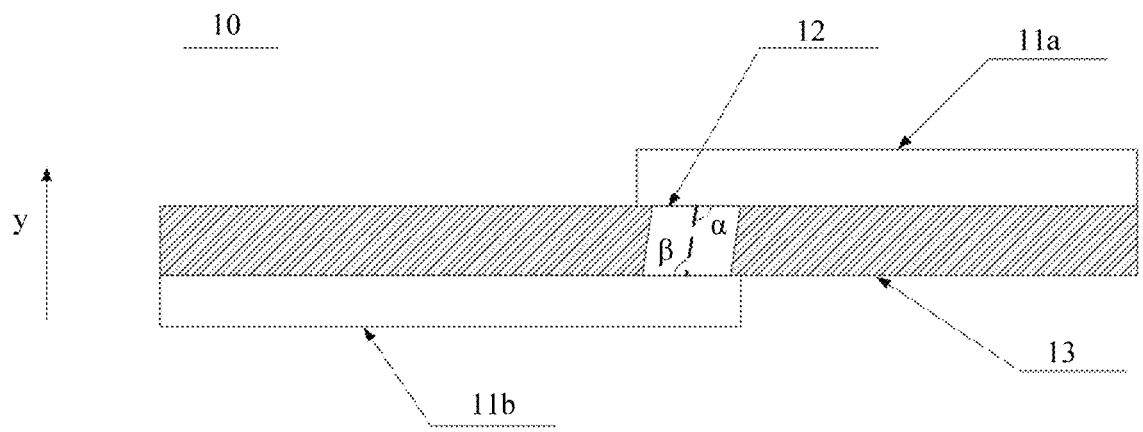
FIG. 3B is a schematic diagram of still another optical waveguide structure according to an illustrative embodiment of this application.

FIG. 3B is a schematic diagram of still another optical waveguide structure according to an illustrative embodiment of this application. An angle formed between an extension direction of the first optical waveguide channel 12 and a plane on which any connected optical waveguide (the first optical waveguide 11a or the second optical waveguide 11b shown in FIG. 1, FIG. 3A, or FIG. 3B) is located ranges from 45° to 135°. This facilitates manufacturing of the first optical waveguide channel 12, and also implements effective total reflection of an optical signal in the first optical waveguide channel 12. For example, in FIG. 3B, an angle α formed between a plane on which the first optical waveguide channel 12 is located and a plane on which the connected first optical waveguide 11a is located ranges from 45° to 135°. An angle β formed between the plane on which the first optical waveguide channel 12 is located and a plane on which the connected second optical waveguide 11b is located ranges from 45° to 135°. It should be noted that an optical waveguide in the optical waveguide structure 10 extends generally along a straight line on a plane on which the optical waveguide is located, and extends along a fold line in a few cases. This facilitates manufacturing of the optical waveguide structure and improves integration of the optical waveguide structure. The first optical waveguide channel 12 extends along a straight line. This facilitates manufacturing of the first optical waveguide channel and reduces complexity of a manufacturing process. In an optional example, the extension direction of the first optical waveguide channel 12 is obliquely connected to the plane on which any connected optical waveguide is located, so that efficiency of total reflection can be improved and an optical signal can be effectively transmitted.

In this embodiment of this application, the first optical waveguide channel 12 may be an ion doped channel and is a channel formed by performing ion doping on the dielectric layer 13. For an ion doping process, refer to a process in a subsequent method embodiment. A substrate of the first optical waveguide channel 12 and a substrate of the dielectric layer 13 have a same lattice atomic arrangement structure, for example, both are hexahedral or octahedral. The lattice atomic arrangement structure of the first optical waveguide channel 12 does not change relative to the dielectric layer 13, but at least some atoms are replaced.

Figure 4:
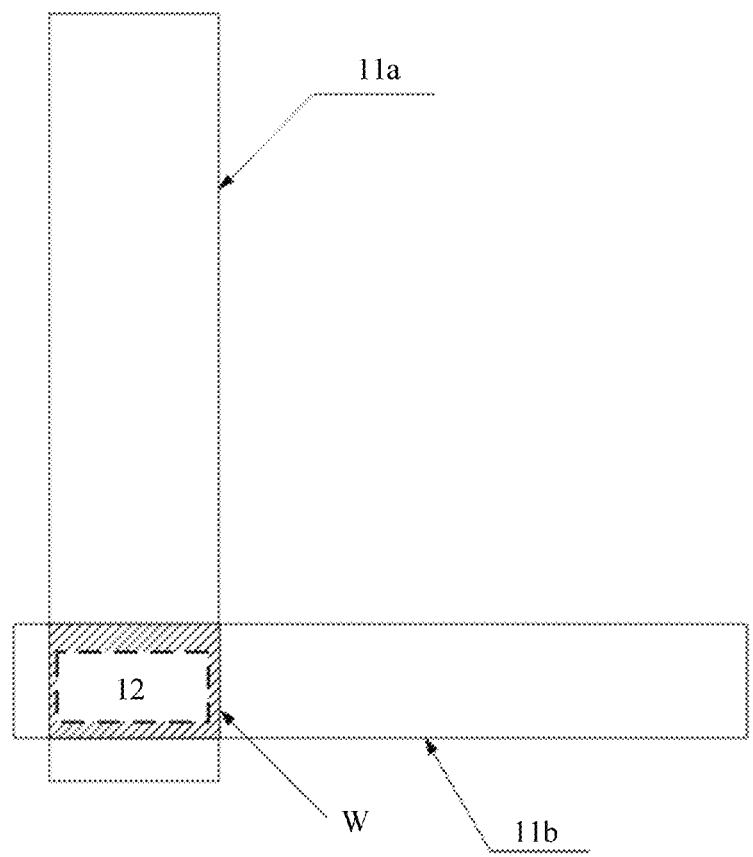
FIG. 4 and FIG. 5 are schematic diagrams of top views of two illustrative optical waveguide structures according to an illustrative embodiment of this application.
Figure 5:
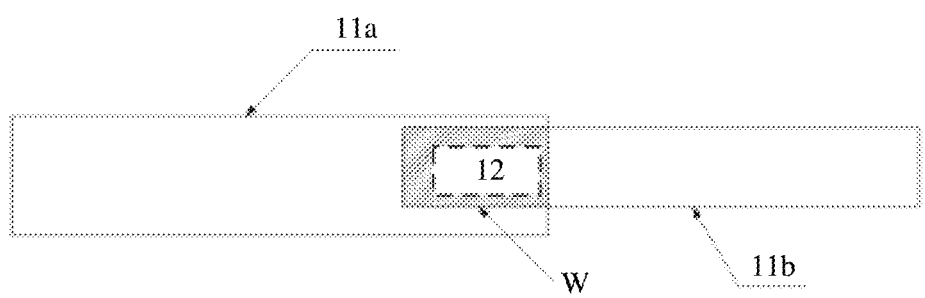

If the first optical waveguide 11a and the second optical waveguide 11b do not overlap in the stacking direction y of the first optical waveguide 11a and the second optical waveguide 11b, an ion gun performs ion doping at a large angle to manufacture the first optical waveguide channel, so that two ends of the manufactured first optical waveguide channel are physically connected to the first optical waveguide 11a and the second optical waveguide 11b. It is easy to cause a connection failure. Embodiments of this application provide an optical waveguide structure, which can reduce the occurrence of the connection failure. FIG. 4 and FIG. 5 are schematic diagrams of top views of two illustrative optical waveguide structures according to an embodiment of this application. As shown in FIG. 4 and FIG. 5, the stacking direction y is a direction perpendicular to the paper. In the stacking direction of the first optical waveguide 11a and the second optical waveguide 11b, projections of a first region of the first optical waveguide 11a and a second region of the second optical waveguide 11b on a plane (that is, a plane parallel to the paper in FIG. 4 and FIG. 5) parallel to the first optical waveguide and the second optical waveguide overlap (completely or partially overlap), and the first optical waveguide channel connects the first region and the second region. As shown in FIG. 4 and FIG. 5, assuming that an overlapping region W (that is, a shadow region in FIG. 4 and FIG. 5) is the projections of the first region and the second region on the plane parallel to the first optical waveguide and the second optical waveguide, a projection of the first optical waveguide channel 12 on the plane parallel to the first optical waveguide and the second optical waveguide is located in the overlapping region W. In this way, the first optical waveguide channel 12 is located within an overlapping range of the first optical waveguide 11a and the second optical waveguide 11b in the stacking direction. When performing ion doping through the dielectric layer, an ion gun can form the first optical waveguide channel without using a large tilt angle. This reduces complexity of a manufacturing process. In FIG. 5, extension directions the first optical waveguide and the second optical waveguide are parallel at the connection with the first optical waveguide channel, so that an optical signal is transmitted in the first optical waveguide or the second optical waveguide through the first optical waveguide channel.

Figure 6:
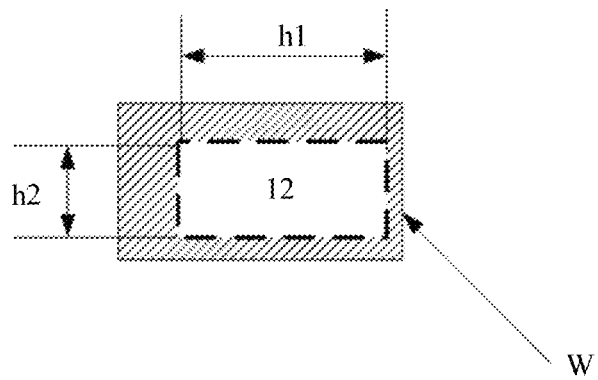
FIG. 6 is an enlarged schematic diagram of an overlapping region W of the optical waveguide structures in FIG. 4 and FIG. 5.

FIG. 6 is an enlarged schematic diagram of the overlapping region W of the optical waveguide structures in FIG. 4 and FIG. 5. As shown in FIG. 6, a length h1 or a width h2 of a cross section of the first optical waveguide channel 12 ranges from 500 nm to 5 μm, and the cross section is perpendicular to the stacking direction of the first optical waveguide 11a and the second optical waveguide 11b. It should be noted that a shape of the cross section may be rectangular or circular, and FIG. 6 is only a schematic illustration and does not define the shape of the cross section of the first optical waveguide channel.

Figure 7:
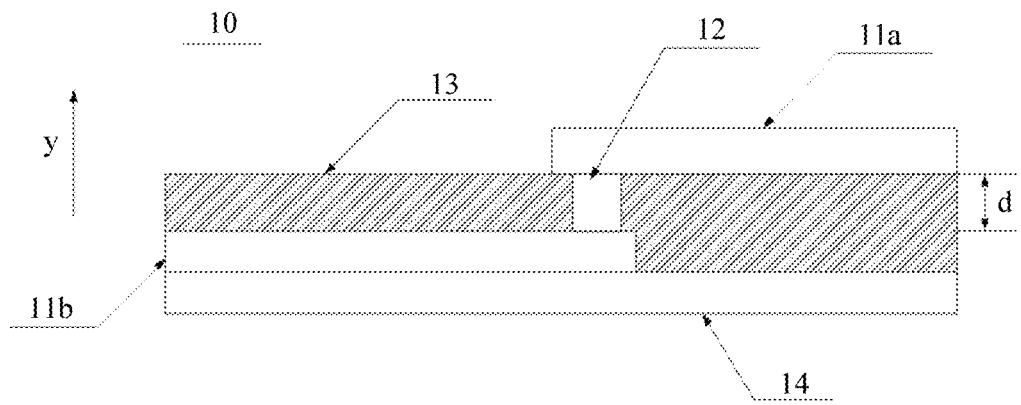
FIG. 7 is a schematic diagram of yet another optical waveguide structure according to an illustrative embodiment of this application.

In this embodiment of this application, the optical waveguide structure 10 is a hardware product having a physical structure. For example, the optical waveguide structure 10 may be an optical chip. FIG. 7 is a schematic diagram of yet another optical waveguide structure according to an illustrative embodiment of this application. As shown in FIG. 7, the optical waveguide structure 10 further includes a substrate 14. The at least two optical waveguides 11, the first optical waveguide channel 12, and the dielectric layer 13 are all located on the substrate 14. The substrate may be made of silicon dioxide, silicon, silicon nitride, sapphire, or the like.

Figure 8:
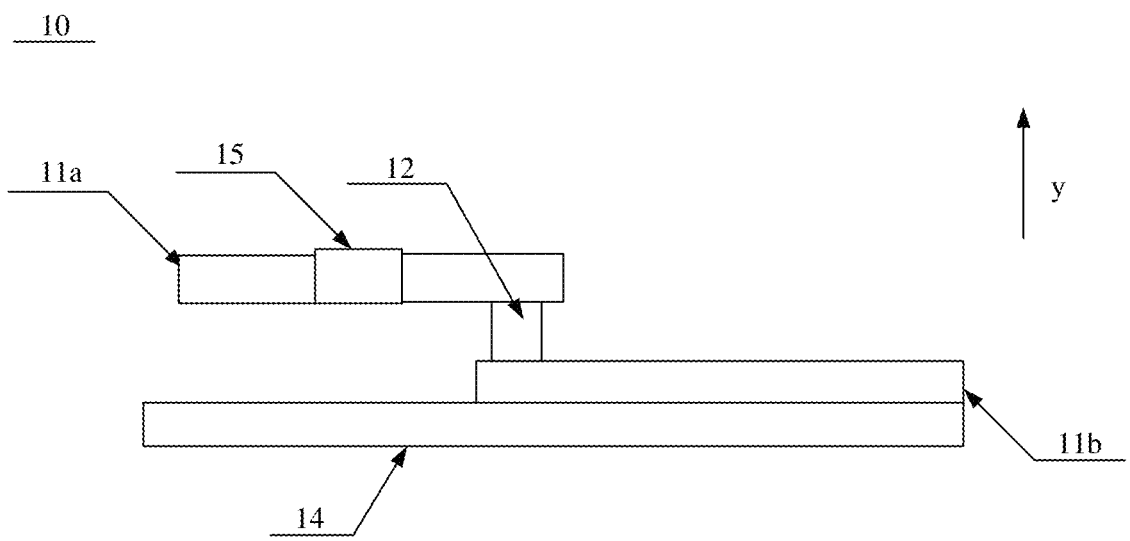
FIG. 8 is a schematic diagram of an optical waveguide structure according to another illustrative embodiment of this application.

In this embodiment of this application, the optical waveguide structure 10 may further include an optical switch (optical switch). The optical switch is configured to control a transmission direction of an optical signal to implement routing of the optical signal. FIG. 8 is a schematic diagram of an optical waveguide structure according to another illustrative embodiment of this application. As shown in FIG. 8, the optical waveguide structure 10 further includes an optical switch 15 connected to the first optical waveguide 11a. The optical switch 15 is configured to perform routing of an optical signal, so that the optical signal is transmitted along the first optical waveguide 11a or transmitted along the second optical waveguide 11b. In FIG. 8, the first optical waveguide 11a is located at an upper layer of the second optical waveguide 11b. That the first optical waveguide 11a is located at an upper layer of the second optical waveguide 11b means that the first optical waveguide 11a is farther from the substrate 14 than the second optical waveguide 11b when the optical waveguide structure 10 is actually used. The optical switch 15 is disposed on the optical waveguide at the upper layer to facilitate manufacturing of the optical switch and control of the optical switch. As shown in FIG. 8, an optical signal transmitted along the first optical waveguide 11a may be transmitted downward to the second optical waveguide 11b through the optical switch 15 and the first optical waveguide channel 12 in sequence. Alternatively, an optical signal transmitted along the second optical waveguide 11b may be transmitted upward to the first optical waveguide 11a through the optical switch 15 and the first optical waveguide channel 12 in sequence.

Figure 9:
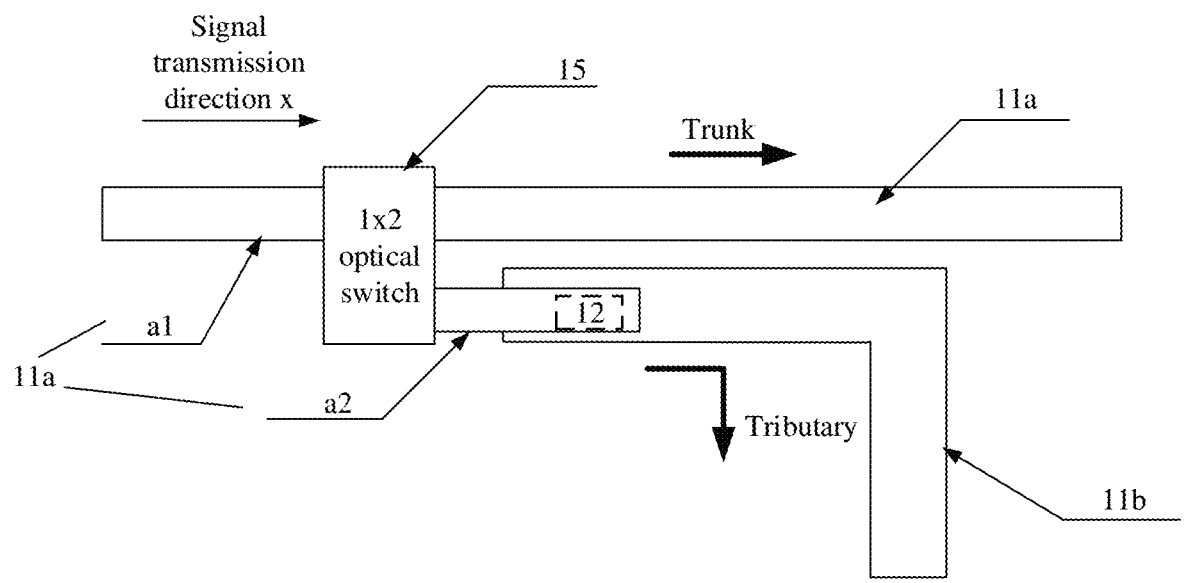
FIG. 9 and FIG. 10 are schematic diagrams of top views of two optical waveguide structures in which optical switches are 1×2 optical switches according to an illustrative embodiment of this application.
Figure 10:
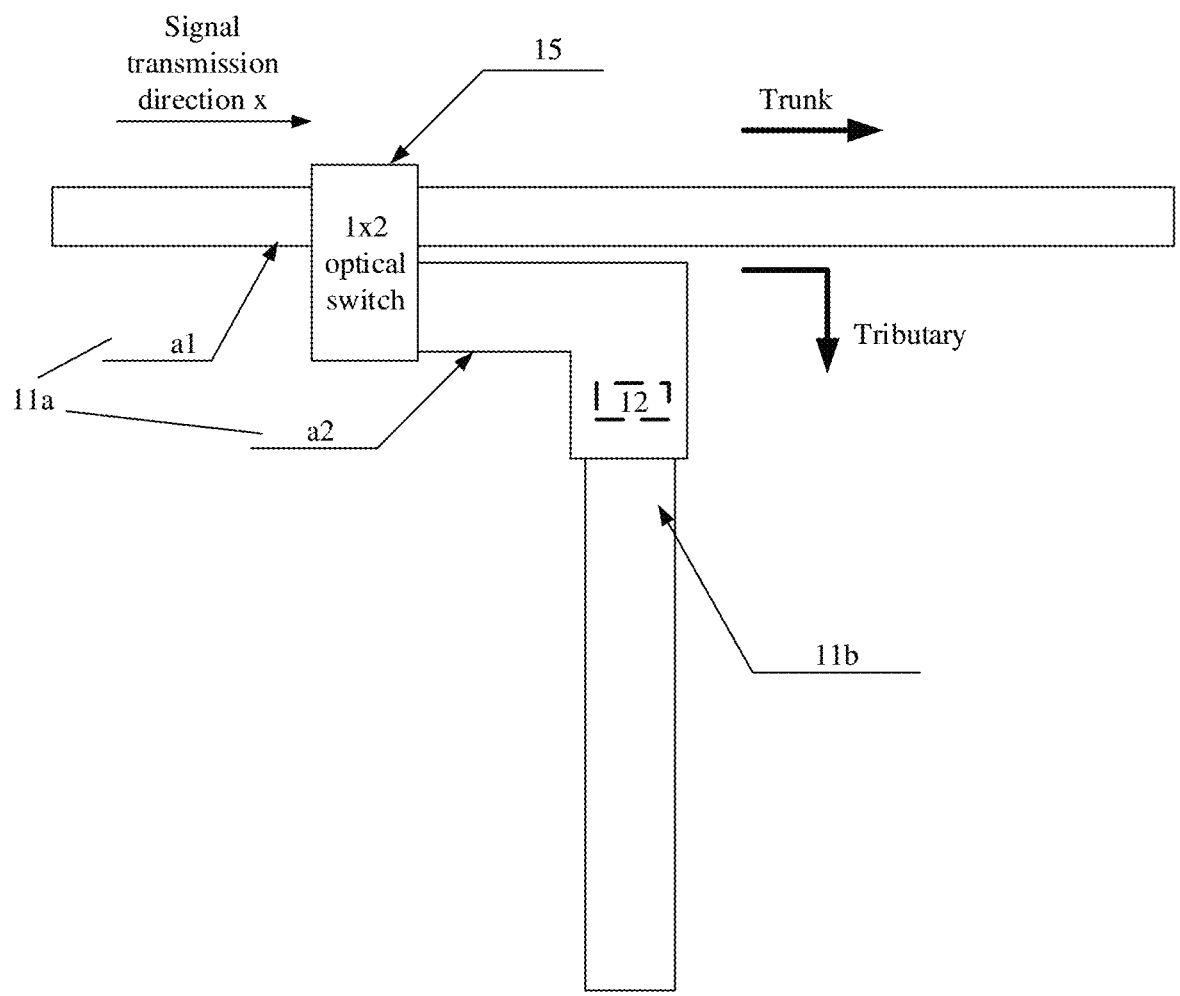
Figure 11:
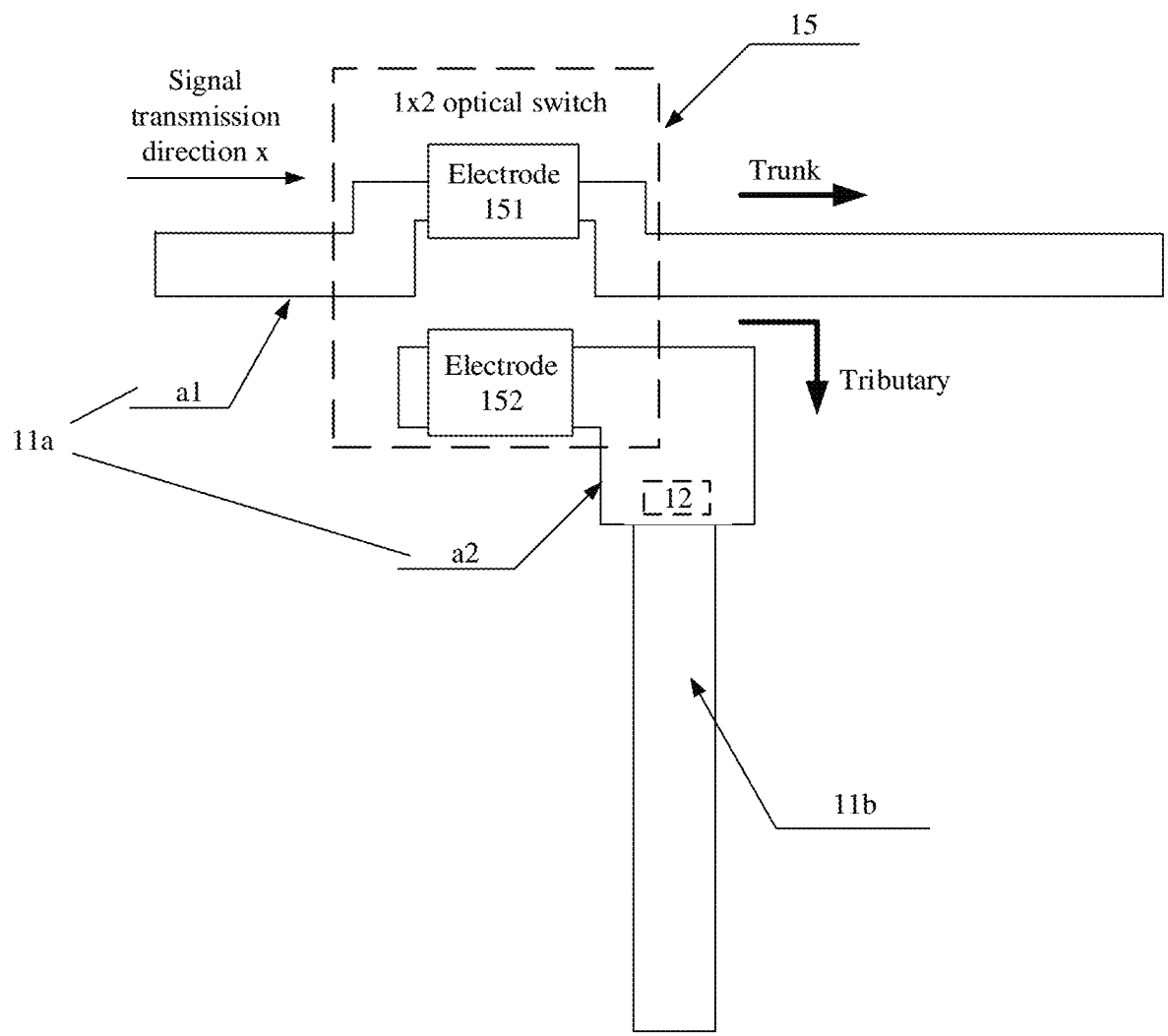
FIG. 11 is a schematic diagram of a specific structure of the optical waveguide structure shown in FIG. 10.

The optical switch provided in embodiments of this application may be a 1×2 optical switch (that is, an optical switch having one input port and two output ports). For example, the optical switch is a waveguide type optical switch (or referred to as a waveguide optical switch). A waveguide type optical switch is an optical switch that changes an optical path by changing a refractive index of a waveguide by using an electro-optic effect, a magneto-optic effect, an acousto-optic effect, a thermo-optic effect, or the like. For example, FIG. 9 and FIG. 10 are schematic diagrams of top views of two optical waveguide structures in which optical switches 15 are 1×2 optical switches according to an embodiment of this application. FIG. 11 is a schematic diagram of a specific structure of the optical waveguide structure shown in FIG. 10. The 1×2 optical switch of the optical waveguide structure shown in FIG. 11 is a waveguide type optical switch that changes a refractive index of a waveguide by using an electro-optic effect. In FIG. 9 to FIG. 11, it is assumed that an optical signal of the optical waveguide structure is input in a signal transmission direction x, and is divided into a trunk and a tributary through the optical switch 15. Optionally, the trunk and the tributary have different extension directions.

In FIG. 9 to FIG. 11, the first optical waveguide 11a includes a first optical waveguide trunk a1 and a first optical waveguide tributary a2. The first optical waveguide tributary a2 is connected to the second optical waveguide 11b through the first optical waveguide channel 12. As shown in FIG. 11, the optical switch 15 includes an electrode 151 disposed on the first optical waveguide trunk a1 and an electrode 152 disposed on the first optical waveguide tributary a2. The optical switch 15 adjusts a refractive index of an optical signal in the first optical waveguide by controlling voltages applied to the electrode 151 and the electrode 152, to implement routing in the first optical waveguide trunk a1 and the first optical waveguide tributary a2. Assuming that a transmission direction of the optical signal is the signal transmission direction x, an optical signal transmitted from the first optical waveguide trunk a1 is selected to continue to be transmitted along the first optical waveguide trunk a1 (that is, in a direction from left to right in FIG. 9), and an optical signal transmitted from the first optical waveguide tributary a2 is selected to be transmitted along the second optical waveguide 11b through the first optical waveguide channel 12. Because an optical path is reversible, if an optical signal in the optical waveguide structure is transmitted in a direction (that is, a direction from right to left in FIG. 9) opposite to the signal transmission direction x, an optical signal transmitted from the first optical waveguide trunk a1 is selected to continue to be transmitted along the first optical waveguide trunk a1 through the optical switch 15, and an optical signal transmitted in the second optical waveguide 11b is selected to be transmitted along the first optical waveguide trunk a1 through the first optical waveguide tributary a2 and the optical switch 15 in sequence. For the structure of the optical switch 15 in the optical waveguide structure shown in FIG. 9, refer to the structure of the optical switch 15 in the optical waveguide structure shown in FIG. 11. Details are not described in this embodiment of this application.

Figure 12:
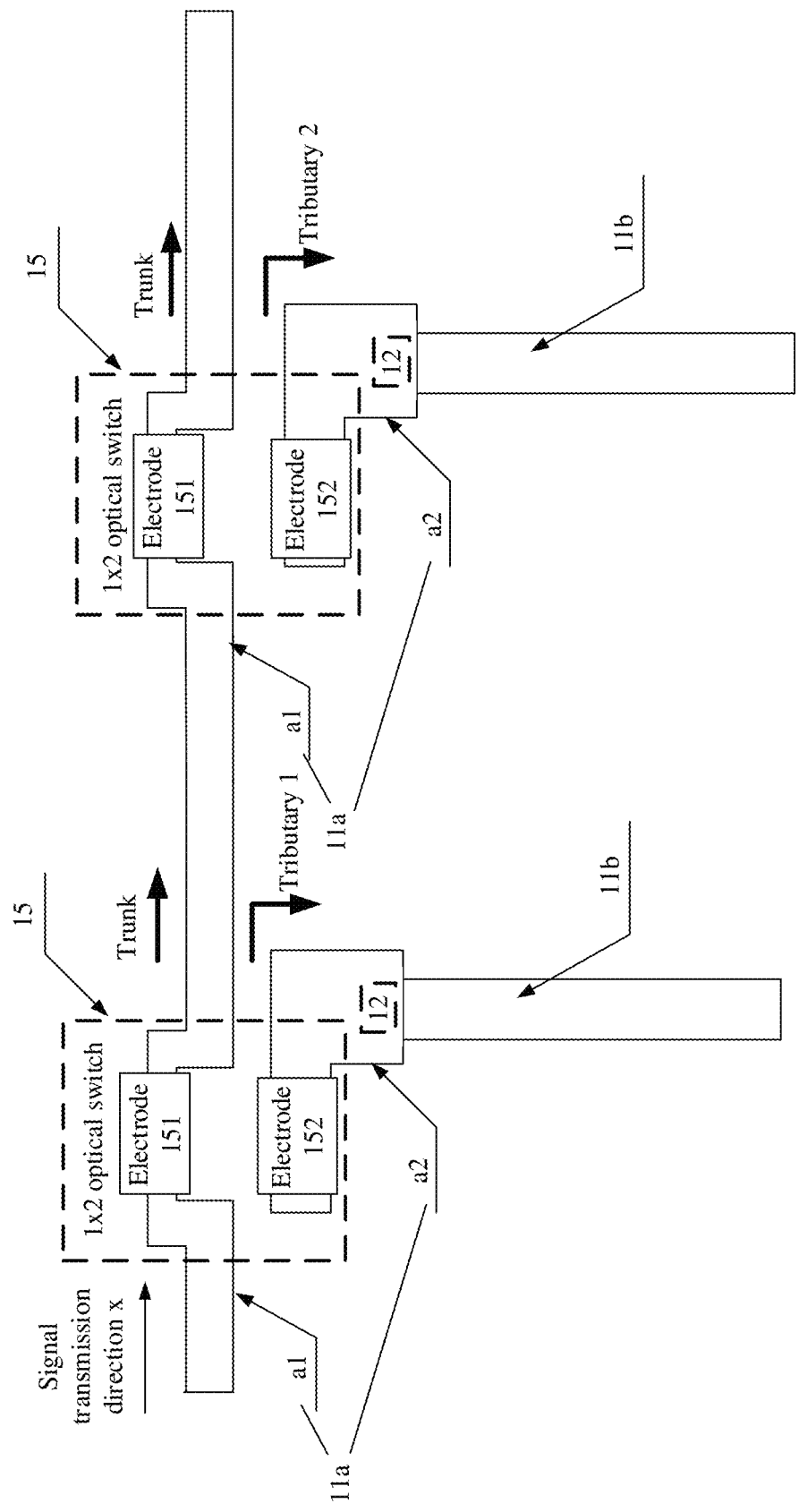
FIG. 12 is a schematic diagram of an optical waveguide structure with at least two optical switches according to an illustrative embodiment of this application.

FIG. 12 is a schematic diagram of an optical waveguide structure 10 with at least two optical switches according to an embodiment of this application. In FIG. 12, it is assumed that there are two optical switches 15 in the optical waveguide structure, but a quantity of optical switches is not limited. In FIG. 12, a quantity of optical switches connected to the first optical waveguide 11a is the same as a quantity of first optical waveguide channels connected to the first optical waveguide 11a. The first optical waveguide channels 12 connected to the first optical waveguide 11a and the optical switches 15 on the first optical waveguide 11a are alternately arranged one by one. In this way, multi-level routing of a layer at which the first optical waveguide 11a is located can be implemented, and each optical switch 15 corresponds to one routing level. For example, the optical waveguide structure 10 includes at least two second optical waveguides 11b, and a quantity of second optical waveguides 11b is the same as the quantity of first optical waveguide channels 12. In FIG. 12, it is assumed that the optical switch 15 is a 1×2 optical switch. An optical signal of the optical switch 15 is controlled to be output from different output ports of the optical switch, to control an optical signal of the first optical waveguide 11a to be transmitted along different paths, so as to implement routing of the optical signal. For example, optical signals can be controlled, by using two optical switches 15, to be transmitted along a trunk, a tributary 1, or a tributary 2.

A quantity and disposing positions of optical switches in the optical waveguide structure vary in different optical signal transmission scenarios. For example, as shown in FIG. 12, an optical switch 15 is disposed in front of each first optical waveguide channel 12 in the optical signal transmission direction x in the first optical waveguide 11a. It should be noted that when the first optical waveguide 11a includes the first optical waveguide trunk a1 and the first optical waveguide tributary a2, the optical signal transmission direction x in the first optical waveguide 11a is an optical signal transmission direction of the first optical waveguide trunk a1. For example, if an optical signal is transmitted in an opposite direction of the optical signal transmission direction x in the first optical waveguide 11a, it may be considered that one optical switch 15 is disposed after each first optical waveguide channel 12.

Figure 13A:
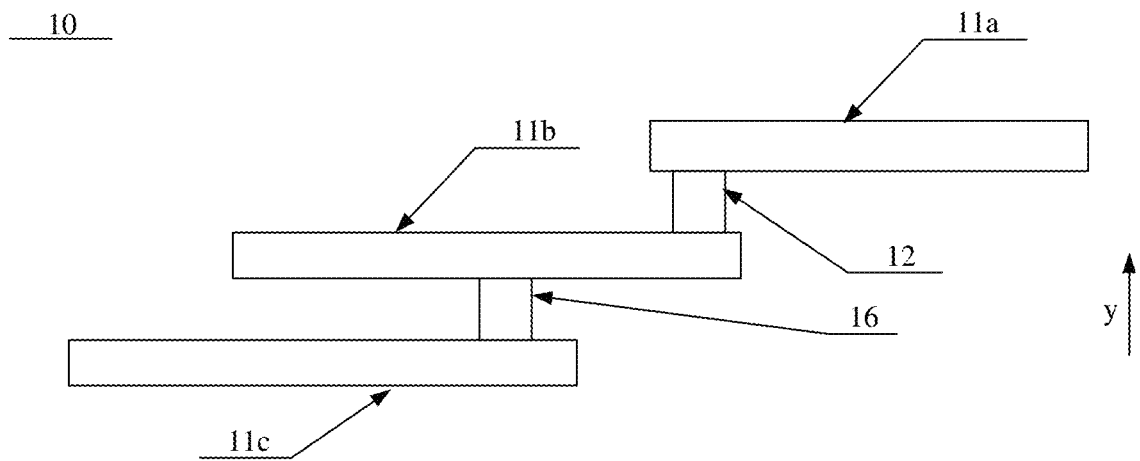
FIG. 13A is a schematic diagram of an optical waveguide structure according to still another illustrative embodiment of this application.
Figure 13B:
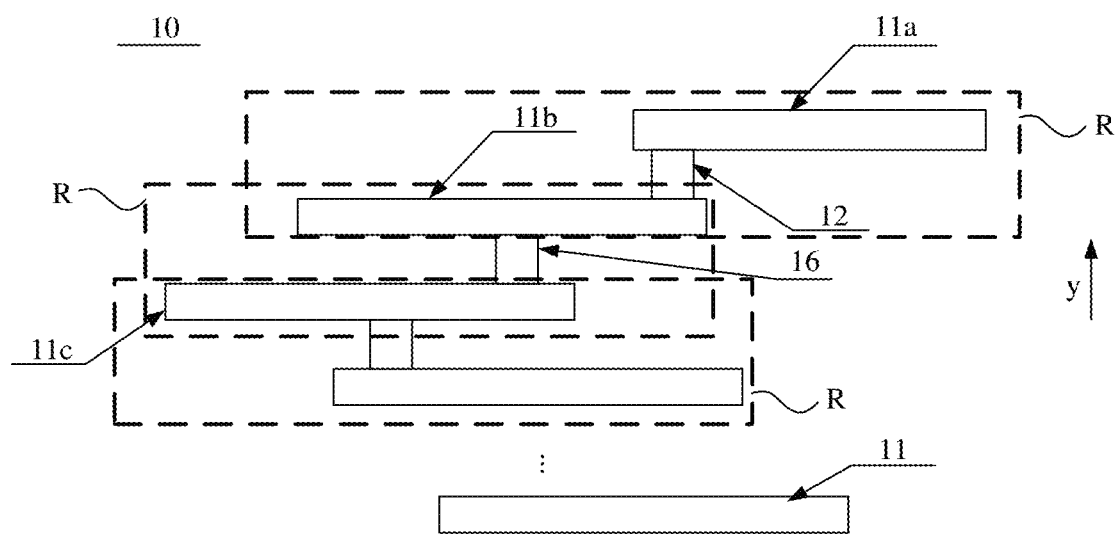
FIG. 13B is a schematic diagram of another optical waveguide structure according to still another illustrative embodiment of this application.

The foregoing embodiment of this application is described by using an example in which at least two optical waveguides 11 include two optical waveguides located at different layers. During actual implementation, the at least two optical waveguides 11 may further include a third optical waveguide 11c. The third optical waveguide 11c, the first optical waveguide 11a, and the second optical waveguide 11b each are located at a different layer. FIG. 13A and FIG. 13B are schematic diagrams of two optical waveguide structures according to still another illustrative embodiment of this application. In an optional implementation, as shown in FIG. 13A, a second optical waveguide channel 16 is disposed between the third optical waveguide 11c and the second optical waveguide 11b, and two ends of the second optical waveguide channel 16 between the third optical waveguide 11c and the second optical waveguide 11b are physically connected to the second optical waveguide 11b and the third optical waveguide 11c. For the second optical waveguide 11b, the third optical waveguide 11c, and structures such as the second optical waveguide channel 16, a dielectric layer, and/or an optical switch between the second optical waveguide 11b and the third optical waveguide 11c in the stacking direction y, refer to the first optical waveguide 11a, the second optical waveguide 11b, and the structures between the first optical waveguide 11a and the second optical waveguide 11b in the stacking direction y. In another optional implementation, a second optical waveguide channel 16 is disposed between the third optical waveguide 11c and the first optical waveguide 11a, and two ends of the second optical waveguide channel 16 between the third optical waveguide 11c and the first optical waveguide 11a are physically connected to the third optical waveguide 11c and the first optical waveguide 11a. For example, for the first optical waveguide 11a, the third optical waveguide 11c, and structures such as the second optical waveguide channel, a dielectric layer, and/or an optical switch between the first optical waveguide 11a and the third optical waveguide 11c in the stacking direction y, refer to the first optical waveguide 11a, the second optical waveguide 11b, and the structures between the first optical waveguide 11a and the second optical waveguide 11b in the stacking direction y. The third optical waveguide and the second optical waveguide channel physically connected to the third optical waveguide are disposed, so that an optical signal can be transmitted in optical waveguides at more layers.

FIG. 13B provides description by using an example in which at least two optical waveguides include k layers of optical waveguides, and k≥3. An optical waveguide channel is disposed between every two adjacent optical waveguides, and two ends of the optical waveguide channel are physically connected to the two adjacent optical waveguides. In FIG. 13B, in a stacking direction y (which is the same as the stacking direction of the first waveguide 11a and the second optical waveguide 11b) of at least two optical waveguides, the optical waveguide structure 10 may be divided into a plurality sub-structures R. Each sub-structure R includes two optical waveguides and one optical waveguide channel. Every two adjacent sub-structures reuse one optical waveguide or there is no coincident optical waveguide between every two adjacent sub-structures (that is, no optical waveguide is reused). Structures of different sub-structures may be the same or different. For a specific structure of each sub-structure, refer to the first optical waveguide 11a, the second optical waveguide 11b, and structures such as the first optical waveguide channel, the dielectric layer, and/or the optical switch between the first optical waveguide 11a and the second optical waveguide 11b in the stacking direction y of at least two optical waveguides in any one of FIG. 2 to FIG. 12. For example, for the second optical waveguide 11b, the third optical waveguide 11c, and structures such as the second optical waveguide channel 16, a dielectric layer, and/or an optical switch between the second optical waveguide 11b and the third optical waveguide 11c in the stacking direction y, refer to the first optical waveguide 11a, the second optical waveguide 11b, and the structures between the first optical waveguide 11a and the second optical waveguide 11b in the stacking direction y. Each sub-structure is not described in this embodiment of this application. In the different sub-structures R, extension directions of the first optical waveguides may be parallel, and extension directions of the second optical waveguides may be parallel.

According to this embodiment of this application, during actual implementation, a positional relationship of at least two optical waveguides in the optical waveguide structure may also be adjusted according to an actual application scenario. For example, the at least two optical waveguides may also include optical waveguides located at the same layer, and/or an optical waveguide channel is disposed between non-adjacent optical waveguides. Any modification, equivalent replacement, or improvement made without departing from the spirit and principle of this application shall fall within the protection scope of this application. Therefore, this is not described again in embodiments of this application.

In the foregoing embodiment, when the optical waveguide structure is an optical chip, a structure of the optical chip is described only by using an example in which the optical waveguide, the optical waveguide channel, the dielectric layer, and/or the optical switch are formed on the substrate of the optical chip. According to this embodiment of this application, during actual implementation, another element component may be further formed on the substrate of the optical waveguide structure, and the optical waveguide structure may further include an encapsulation structure. This is not limited in embodiments of this application.

Figure 14:
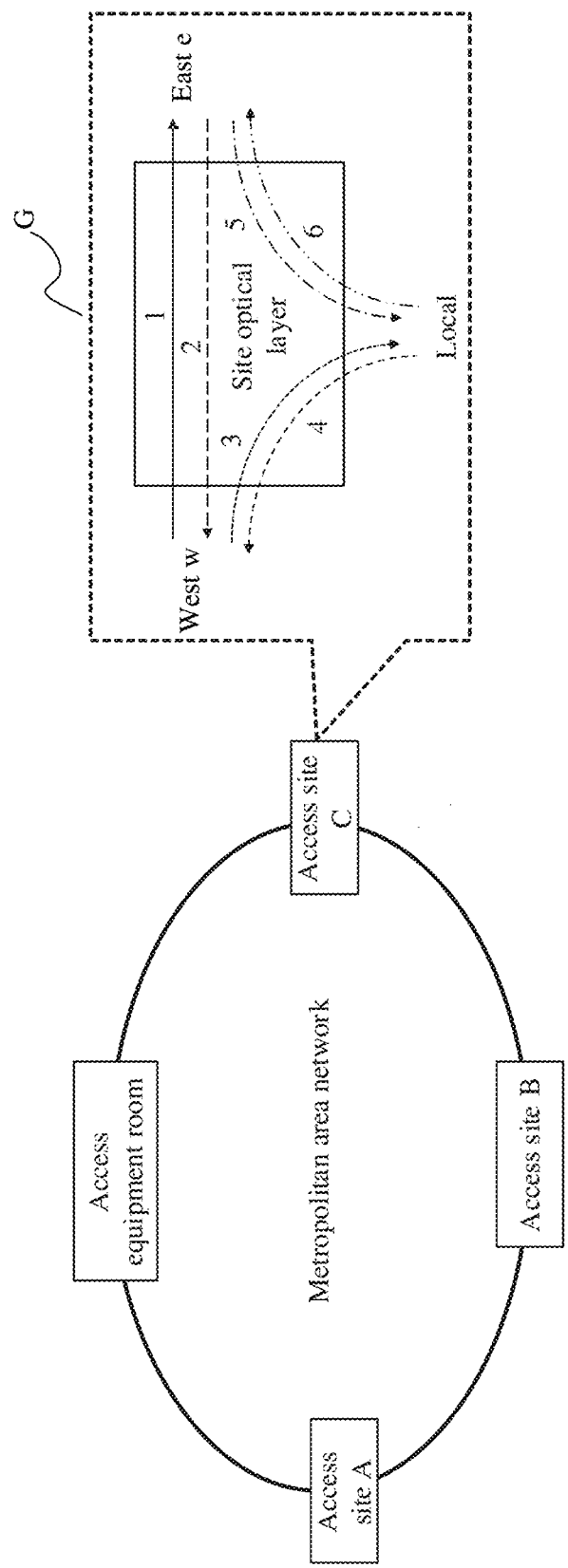
FIG. 14 is a schematic diagram of a metropolitan area network according to an illustrative embodiment of this application.

The optical waveguide structure provided in embodiments of this application can be used in a plurality of optical communication scenarios. For example, the optical waveguide structure may be used in an optical transmission network, such as a wavelength division network or a metropolitan area network. FIG. 14 is a schematic diagram of a metropolitan area network according to an illustrative embodiment of this application. To facilitate the reader's understanding, embodiments of this application describe the metropolitan area network by using FIG. 14 as an example. The metropolitan area network, also referred to as a metropolitan area access optical network, includes at least two access sites. In FIG. 14, it is assumed that the metropolitan area network includes three access sites: access sites A, B, and C. An optical signal output from an access equipment room is input to the access equipment room through the access sites A, B, and C, to form a looped network of the metropolitan area network. Each access site supports optical signal transmission in two directions. The two directions are opposite. In FIG. 14, it is assumed that the two directions are the west w and the east e, and both directions are line directions, that is, directions in the looped network of the metropolitan area network. Each access site is also connected to a local communication device of the site, and the local communication device belongs to a local communication system.

There are two types of wavelengths for optical signals transmitted in the metropolitan area network. The first type is a line wavelength, which is mainly transmitted in an access fiber ring shown in FIG. 14. The second type is a local wavelength, which is transmitted in a local communication system of each access point, and a uniform egress is disposed on an access site.

The line wavelength and the local wavelength can be converted to each other through a site optical layer shown in FIG. 14. A dashed box G in FIG. 14 is an enlarged schematic diagram of the site optical layer of the access site C, and six different wavelength transmission modes are schematically drawn. The six wavelength transmission modes are as follows: "1" indicates to transmit a line-wavelength optical signal in the west w to the east e through the site optical layer of the access site. "2" indicates to transmit a line-wavelength optical signal in the east e to the west w through the site optical layer of the access site. "1" and "2" indicate direct pass through of line-wavelength optical signals at the site optical layer of the access site. The optical signals only pass through the access site and are not downloaded (also referred to as wave drop) to a local communication system. That is, the optical signals are transparently transmitted through the access site. "3" indicates to download a line-wavelength optical signal in the west w to the local through the site optical layer of the access site, to enter the local communication system, so as to implement conversion from the line wavelength to a local wavelength. "4" indicates to upload (also referred to as upload or wave add) a local-wavelength optical signal in the local communication system to the west w through the site optical layer of the access site, to implement conversion from the local wavelength to the line wavelength. "5" indicates to download a line wavelength in the east e to the local through the site optical layer of the access site, to enter the local communication system, so as to implement conversion from the line wavelength to the local wavelength. "6" indicates to upload a wavelength in the local communication system to the east e through the site optical layer of the access site, to implement conversion from the local wavelength to the line wavelength.

For the access site, pass-through and downloading of the line-wavelength optical signals and uploading of local-wavelength optical signals are core capability requirements of the site optical layer. Embodiments of this application provide an optical waveguide module that can be used in any of the access sites in FIG. 14 or another optical switching device. The optical waveguide module supports pass-through and downloading of line-wavelength optical signals and uploading of local-wavelength optical signals. For example, the optical waveguide module may be one optical chip or a set of a plurality of optical chips.

Figure 15:
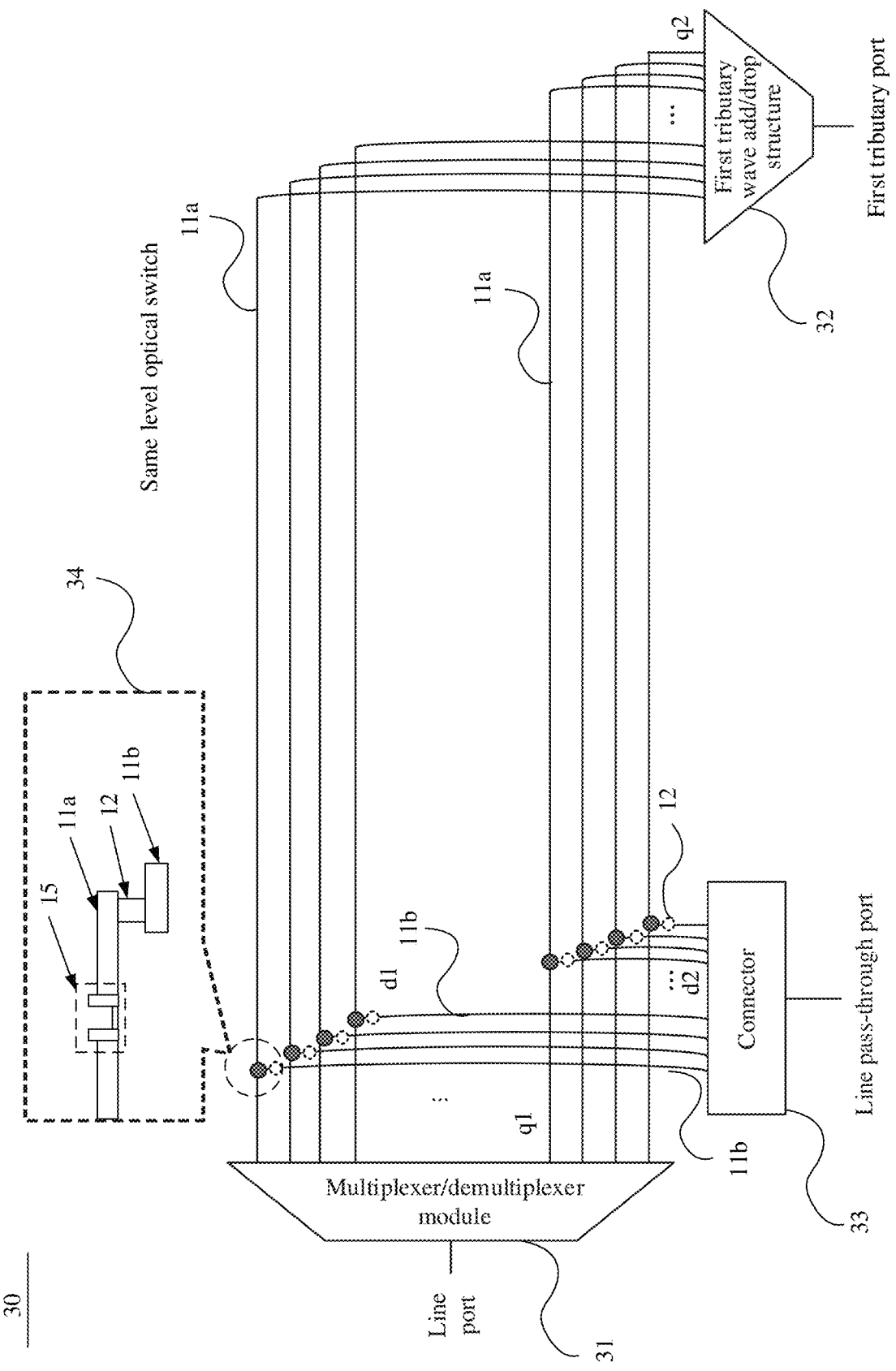
FIG. 15 is a schematic diagram of an optical waveguide module according to an illustrative embodiment of this application.

FIG. 15 is a schematic diagram of an optical waveguide module according to an illustrative embodiment of this application. As shown in FIG. 15, an optical waveguide module 30 includes a multiplexer/demultiplexer module 31, a first tributary wave add/drop structure 32, a connector 33, and at least two optical waveguide structures 34. Each waveguide structure 34 includes at least two waveguides disposed in a stacked manner. The at least two optical waveguides include a first optical waveguide 11a and a second optical waveguide 11b. The first optical waveguide 11a and the second optical waveguide 11b are located at different layers. A first optical waveguide channel 12 is disposed between the first optical waveguide 11a and the second optical waveguide 11b, and two ends of the first optical waveguide channel 12 are physically connected to the first optical waveguide 11a and the second optical waveguide 11b. A first end d1 of the second optical waveguide 11b is connected to the first optical waveguide channel 12. In FIG. 15, an optical switch 15 is schematically represented by a black dot, and the optical waveguide channel such as the first optical waveguide channel 12 is represented by a white dot. For a structure of any optical waveguide structure 34, refer to the structure of the optical waveguide structure 10 in the foregoing embodiments. Details are not described again in this embodiment of this application.

The multiplexer/demultiplexer module 31 has a line port and at least two first optical waveguide connection ports. The at least two first optical waveguide connection ports of the multiplexer/demultiplexer module 31 are one-to-one connected to first ends q1 of first optical waveguides 11a of the at least two optical waveguide structures. The line port of the multiplexer/demultiplexer module 31 is configured to input an optical signal from a line side or output an optical signal to the line side. For example, the multiplexer/demultiplexer module is an arrayed waveguide grating (AWG).

The first tributary wave add/drop structure 32 has a first tributary port and at least two second optical waveguide connection ports. The at least two second optical waveguide connection ports of the first tributary wave add/drop structure 32 are one-to-one connected to second ends q2 of the first optical waveguides 11a of the at least two optical waveguide structures. The first tributary port is configured to upload or download an optical signal.

The connector 33 has a line pass-through port and at least two third optical waveguide connection ports. The at least two third optical waveguide connection ports of the connector 33 each are connected to a second end d2 of a second optical waveguide 11b of each of the at least two optical waveguide structures 34. The line pass-through port is configured to be connected to a line pass-through port of another optical waveguide module. In this way, a line wavelength pass-through function (that is, a line wavelength transparent transmission function) of an optical switching device can be implemented. In this embodiment of this application, a first end and a second end of an optical waveguide are opposite ends in an extension direction of the optical waveguide. If the optical waveguide includes an optical waveguide trunk and an optical waveguide tributary, the first end and the second end are opposite ends of the optical waveguide trunk in the extension direction.

A quantity of first optical waveguide connection ports, a quantity of second optical waveguide connection ports, and a quantity of third optical waveguide connection ports are all the same as a quantity of optical waveguide structures. In other words, in the optical waveguide module, the first optical waveguide connection ports one-to-one correspond to the optical waveguide structures, and the second optical waveguide connection ports one-to-one correspond to the optical waveguide structures. In FIG. 15, it is assumed that each optical waveguide structure 34 includes one first optical waveguide and one second optical waveguide, but a quantity of optical waveguides is not limited.

In conclusion, according to the optical waveguide module provided in this embodiment of this application, in the optical waveguide structure, the first optical waveguide channel is physically connected to two optical waveguides located at different layers, to implement direct-jump transmission of an optical signal between different optical waveguides, so that fewer co-layer cross optical waveguides are used, and crossing of optical waveguides at a same layer is reduced. Therefore, a transmission insertion loss of an optical signal is reduced, and transmission quality of an optical signal is improved. In addition, because the optical waveguides of the optical waveguide structure are disposed in a stacked manner, and are no longer limited to be on one plane, integration of the optical waveguide module can be effectively ensured, and miniaturization of the optical waveguide module is implemented. On this basis, the connector can implement pass-through of a line-wavelength optical signal of a connector of another optical waveguide module through the line pass-through port, to implement a line wavelength pass-through function of the optical switching device. The first tributary wave add/drop structure can upload a local-wavelength optical signal or download a line-wavelength optical signal through a tributary port. In this way, basic functions of the optical switching device can be implemented.

Figure 16:
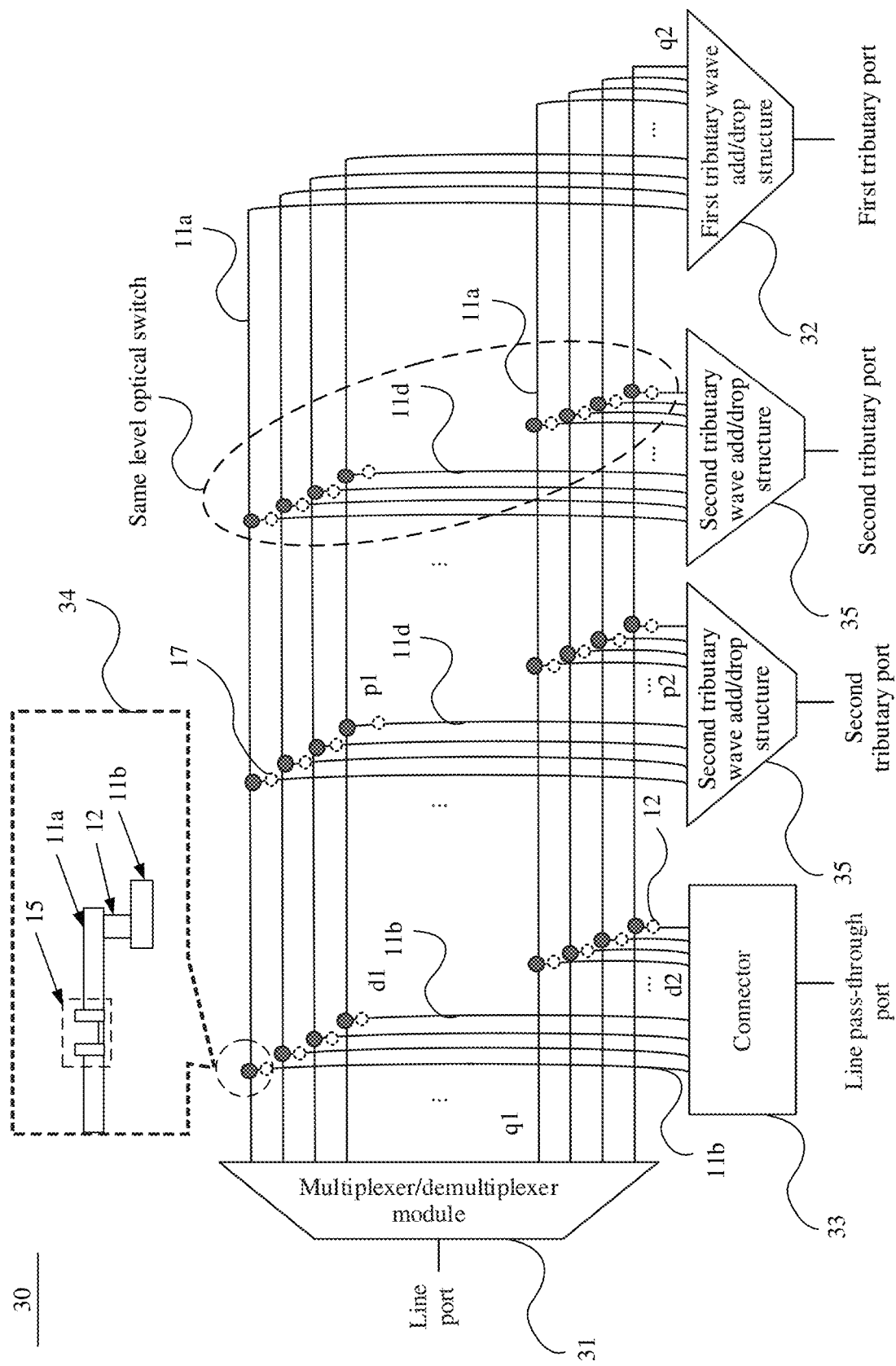
FIG. 16 is a schematic diagram of another optical waveguide module according to an illustrative embodiment of this application.

FIG. 16 is a schematic diagram of another optical waveguide module 30 according to an illustrative embodiment of this application. In an optional example, as shown in FIG. 16, each optical waveguide structure 34 further includes n fourth optical waveguides 11d. The fourth optical waveguides 11d and the first optical waveguide 11a are located at different layers. A third optical waveguide channel 17 is disposed between the first optical waveguide 11a and each fourth optical waveguide 11d, one end of the third optical waveguide channel 17 is connected to the first optical waveguide 11a, the other end is connected to a first end p1 of the fourth optical waveguide 11d, and n is a positive integer. It should be noted that, in each optical waveguide structure, for structures such as the third optical waveguide channel, dielectric layers, and/or optical switches between the n fourth optical waveguides 11d and the first optical waveguide 11a, refer to the first optical waveguide 11a, the second optical waveguide 11b, and the structures between the first optical waveguide 11a and the second optical waveguide 11b in the stacking direction y. For example, a quantity of fourth optical waveguides 11d is the same as a quantity of third optical waveguide channels 17.

In this embodiment of this application, as shown in FIG. 16, the optical waveguide module 30 may further include m second tributary wave add/drop structures 35. The second tributary wave add/drop structure 35 has a second tributary port and a fourth optical waveguide connection port. The fourth optical waveguide connection ports of the m second tributary wave add/drop structures 35 each are connected to a second end p2 of a fourth optical waveguide 11d of each of the at least two optical waveguide structures 34. The second tributary port is configured to upload or download an optical signal. In the optical waveguide module, a quantity of fourth optical waveguide connection ports is the same as the quantity of optical waveguide structures 34. In other words, the fourth optical waveguide connection ports one-to-one correspond to the optical waveguide structures. For explanation of the related reference numerals in FIG. 16, refer to FIG. 15. This is not described in detail in this embodiment. Structures of the first tributary wave add/drop structure 32 and the second tributary wave add/drop structure 35 may be the same, to facilitate manufacturing, and ensure effective uploading and downloading of an optical signal on a tributary side.

In FIG. 16, m=n is used as an example. That is, n fourth optical waveguides 11d included in each optical waveguide structure 34 one-to-one correspond to m second tributary wave add/drop structures 35. During actual implementation, there is still another implementation of a quantity of second tributary wave add/drop structures, and this is not limited in this embodiment of this application.

An optical signal transmission process of an optical waveguide module according to an embodiment of this application is described schematically below by using FIG. 16 as an example. In FIG. 16, it is assumed that an optical signal is input from the line port, and passes through the multiplexer/demultiplexer module. The optical waveguide module includes T optical waveguide structures, and T is an integer greater than 1. In each optical waveguide structure, a quantity of optical switches 15 connected to the first optical waveguide 11a is the same as a quantity of optical waveguide channels (including the first optical waveguide channel 12 and the third optical waveguide channel 17) connected to the first optical waveguide 11a. The optical waveguide channels connected to the first optical waveguide 11a and the optical switches 15 on the first optical waveguide are alternately arranged one by one. In a direction in which the optical signal is transmitted, one optical switch 15 is disposed in front of each optical waveguide channel, and the optical switch 15 is a 1×2 optical switch. As shown in FIG. 16, the optical signal is input from the line port and is divided by the multiplexer/demultiplexer module into T wavelength optical signals transmitted by T wavelength transmission channels corresponding to the first optical waveguides 11a of the T optical waveguide structures. Each wavelength optical signal is transmitted in a transmission direction (for example, the direction from left to right in FIG. 16) of the optical signal. The optical signal is divided into two optical signals again after passing through each optical switch connected to the first optical waveguide 11a. One optical signal is transmitted continuously in the extension direction (that is, the direction from left to right in FIG. 16) of the first optical waveguide 11a, and the other optical signal is transmitted to the second optical waveguide 11b at a layer different from the first optical waveguide 11a through the first optical waveguide channel 12, or the other optical signal is transmitted continuously in the fourth optical waveguide 11d at a layer different from the first optical waveguide 11a through the third optical waveguide channel 17 (that is, a direction from top to bottom in FIG. 16). When passing through each optical switch, an optical signal of each wavelength can be controlled to select one of the two paths for transmission. The optical path is reversible, and a reverse optical signal transmission process is not described in this embodiment of this application.

An optical signal transmitted from the second optical waveguide 11b may directly skip other optical waveguides, and arrive at the connector 33 to be output through the line pass-through port of the connector 33. An optical signal transmitted from the fourth optical waveguide 11d may directly skip other optical waveguides, and arrive at the second tributary wave add/drop structure 35 to be output through the tributary port of the second tributary wave add/drop structure 35. Therefore, the second optical waveguide 11b and the fourth optical waveguide 11d may be referred to as direct-jump waveguides. In each of the second optical waveguide 11b and the fourth optical waveguide 11d, an optical signal can directly skip at least two crosses and arrive at an optical path outlet through only one optical waveguide channel, to avoid a crosstalk insertion loss between the optical waveguides. Therefore, a pass-through insertion loss in each of the second optical waveguide 11b and the fourth optical waveguide 11d is close to a pass-through insertion loss in a single-layer non-cross waveguide, to effectively reduce a transmission insertion loss of the optical signal.

As shown in FIG. 16, assuming that each of the T optical waveguide structures 34 includes one first optical waveguide 11a, one second optical waveguide 11b, and n fourth optical waveguides 11d, each first optical waveguide 11a has n+1 optical switches. The connector 33 is connected to a second end of one second optical waveguide 11b of the T optical waveguide structures 34 through a third optical waveguide connection port, and there are at least T third optical waveguide connection ports of the connector 33. Each second tributary wave add/drop structure 35 is connected to a second end p2 of one fourth optical waveguide 11d of the T optical waveguide structures 34 through a fourth optical waveguide connection port, and there are at least T fourth optical waveguide connection ports of each second tributary wave add/drop structure 35. For each optical waveguide structure 34, it is assumed that the $i^{th}$ optical switch on the first optical waveguide in the optical signal propagation direction is referred to as the $i^{th}$ level optical switch, where $1 \leq i \leq n+1$. In this embodiment of this application, in the optical signal propagation direction, the second optical waveguide connected to the $1^{st}$ optical waveguide channel (that is, the first optical waveguide channel 12 in the figure) after the first level optical switch of each of the T optical waveguide structures 34 is connected to the connector 33, so that the insertion loss of the optical signal of line pass-through is small. The fourth optical waveguides 11d connected to the $1^{st}$ third optical waveguide channels 17 after a same level of optical switches in the T optical waveguide structures 34 are connected to the same second tributary wave add/drop structure. For example, the fourth optical waveguides connected to the $1^{st}$ optical waveguide channels after the second to $(n+1)^{th}$ level optical switches are one-to-one connected to the first to $n^{th}$ second tributary wave add/drop structures 34.

It should be noted that, for ease of understanding by the reader, it is assumed in FIG. 15 and FIG. 16 that in each optical waveguide structure 34, the optical switch 15 is disposed in front of each optical waveguide channel (such as the first optical waveguide channel 12 or the third optical waveguide channel 17) in the optical signal transmission direction of the first optical waveguide 11a, and each optical switch 15 is drawn as an example of a 1×2 optical switch. However, during actual implementation, positions of the first optical waveguide, the second optical waveguide, the fourth optical waveguide, and the optical switch in the optical waveguide module may be adjusted according to a specific application scenario, and types, arrangement, and a quantity of optical switches are not limited in this embodiment of this application. For example, for the structure of the optical waveguide structure 34, referred to the optical waveguide structure shown in any one of FIG. 9 to FIG. 11.

In an optional example, the n fourth optical waveguides 11d are located at a same layer, to facilitate manufacturing and also facilitate connection to the second tributary wave add/drop structures. The structures of the first tributary wave add/drop structure 32 and the second tributary wave add/drop structure 35 are the same or different. When the structures of the first tributary wave add/drop structure 32 and the second tributary wave add/drop structure 35 are the same, manufacturing in the optical waveguide module is facilitated, and manufacturing complexity is reduced.

For example, in each optical waveguide structure, an extension direction of the first optical waveguide 11a is perpendicular to an extension direction of the second optical waveguide 11b, and is parallel to extension directions of the n fourth optical waveguides 11d. In this way, the optical waveguide module can be manufactured in a small area, to improve integration. For example, the at least two optical waveguides further meet at least one of the following: Extension directions of the first optical waveguides 11a in the optical waveguides are parallel, extension directions of the second optical waveguides 11b in the optical waveguides are parallel, and extension directions of the fourth optical waveguides 11d in the optical waveguides are parallel. In this way, integration of the optical waveguide module can be further improved.

In this embodiment of this application, the extension directions of the first optical waveguides 11a in the at least two optical waveguide structures 34 are parallel, and the extension directions of the second optical waveguides 11b in the at least two optical waveguide structures 34 are parallel, so that integration of the optical waveguide module can be further improved. Optionally, in each optical waveguide structure, the second optical waveguide 11b and the fourth optical waveguide 11d may be located at the same layer, or may be located at different layers. When the second optical waveguide 11b and the fourth optical waveguide 11d are located at the same layer, manufacturing is facilitated. When the n fourth optical waveguides 11d are located at the same layer, arrangement of the n fourth optical waveguides 11d and the second optical waveguides 11b may be equivalent to that of the n+1 second optical waveguides 11b shown in FIG. 12.

In this embodiment of this application, the connector 33 in the optical waveguide module may have a plurality of implementations. This embodiment of this application describes the following several optional implementations as examples:

In a first optional implementation, the connector 33 is a multi-core connector.

In a second optional implementation, the connector 33 is a multiplexer/demultiplexer module. For example, the multiplexer/demultiplexer module is an AWG, and the line pass-through port of the connector may be connected to one optical fiber, and is connected to a line pass-through port of a connector of another optical waveguide module through the optical fiber. The connector may converge optical signals of optical waveguides connected to the third optical waveguide connection port into an optical signal transmitted on the optical fiber, to implement connection to the connector of the another optical waveguide module. When the connector is an AWG, line pass-through ports of two optical waveguide modules can be connected through only one optical fiber, which is simple in structure and low in manufacturing costs.

In a third optional implementation, the connector 33 is a multiple-fiber push-on/pull-off (MPO) interface for connection to an optical cable. The MPO includes at least two optical fiber interfaces, and each optical fiber interface is a line pass-through interface. The optical cable includes at least two optical fibers, and each optical fiber is pluggably connected to one optical fiber interface. Each third optical waveguide connection port on the MPO corresponds to one optical fiber interface, and an optical signal of an optical waveguide connected to each third optical waveguide connection port is transmitted to an optical fiber connected to a corresponding optical fiber interface through the optical fiber interface, and transmitted from the optical fiber to a connector of another optical waveguide module. When the connector is the MPO, the line pass-through ports of the two optical waveguide modules are connected through one optical cable (including a plurality of optical fibers), and a transmission insertion loss of an optical signal is smaller than that of the optical signal transmission using the AWG as the connector.

In a fourth optional implementation, the connector 33 is an optical fiber ferrule for connection to an optical fiber array. Each connector 33 includes at least two optical fiber ferrules, and each optical fiber ferrule has one third optical waveguide connection port and one line-through interface. The optical fiber array includes at least two optical fibers, and each optical fiber is connected to one optical fiber ferrule. An optical signal of an optical waveguide connected to the third optical waveguide connection port of each optical fiber ferrule is transmitted, through the optical fiber ferrule, to an optical fiber connected to the line pass-through port of the optical fiber ferrule, and is transmitted to a connector of another optical waveguide module through the optical fiber. When the connector is the optical fiber ferrule, line pass-through ports of two optical waveguide modules are connected through optical fiber arrays, and optical fibers in the optical fiber arrays of the two optical waveguide modules are one-to-one connected, so that an insertion loss is less than that in optical signal transmission using the AWG as the connector.

In this embodiment of this application, there are various implementations of the tributary wave add/drop structure such as the first tributary wave add/drop structure 32 and/or the second tributary wave add/drop structure 35. This embodiment of this application describes the following several optional implementations as examples:

In a first optional implementation, the tributary wave add/drop structure is a multiplexer/demultiplexer module.

In a second optional implementation, the tributary wave add/drop structure is an AWG. The tributary side converges optical waveguide signals received by a plurality of optical waveguide connection ports to one tributary port by using the AWG, and each tributary port can implement free unblocked wave add/drop of one or at least two wavelengths, to effectively implement colorless wave add/drop of an optical signal of the optical waveguide module. If the tributary wave add/drop structure is the first tributary wave add/drop structure, the tributary port is the first tributary port. If the tributary wave add/drop structure is the second tributary wave add/drop structure, the tributary port is the second tributary port.

In a third optional implementation, the tributary wave add/drop structure is a cascaded optical switching structure having 2N first ports (also referred to as a shunt port) and one second port (also referred to as a common port), where N is a positive integer, and is a quantity of levels of switches of the tributary wave add/drop structure. If M first ports are selected for use, the tributary wave add/drop structure is also referred to as an M-path cascaded optical switch structure or a 1×M cascaded optical switch structure. The M paths mean that M paths through which the optical signals pass in the cascaded optical switch structure (that is, 2N paths are available, but M paths are actually used), and M is an integer greater than 1. If the tributary wave add/drop structure is the first tributary wave add/drop structure, the first port is the second optical waveguide connection port, and the second port is the first tributary port. If the tributary wave add/drop structure is the second tributary wave add/drop structure, the first port is the fourth optical waveguide connection port, and the second port is the second tributary port.

The tributary wave add/drop structure is configured to: after receiving a logic control instruction, control, based on the logic control instruction, the second port to connect to one of the $2^N$ first ports, and disconnect from another first port. Thus, one path in the tributary wave add/drop structure is conductive and another path is closed. The tributary wave add/drop structure supports passing of optical signals of only one wavelength, or passing of optical signals of different wavelengths in time segments (that is, optical signals of only one wavelength pass through at a moment). With this tributary wave add/drop structure, wave add/drop of an optical signal can be controlled by the logic control instruction, and manufacturing costs of the optical waveguide module are further reduced.

Optionally, M meets $2^{N-1}<M\leq 2^N$. In this way, the structure of the cascaded optical switch structure is similar to a binary tree structure. The cascaded optical switch structure includes N levels of switches, and each level of switch includes at least one switch. In an ascending order of quantities of switches in the N levels of switches, in the first N-1 levels of switches, each switch has two lower-level switches, that is, two lower-level tributaries. Each switch in the $N^{th}$-level switch has two lower-level tributaries, which are two first ports. Accordingly, the logic control instruction includes N bits. The N bits indicate the M paths in a binary manner. The N bits occupy less memory space and have fewer communication overheads. For example, $2^{N-1}<M<2^N$. For example, in a 1×12 cascaded optical switch structure, N=4. For example, in a 1×20 cascaded optical switch structure, N=5. For example, in a 1×40 cascaded optical switch structure, N=6.

Figure 17:
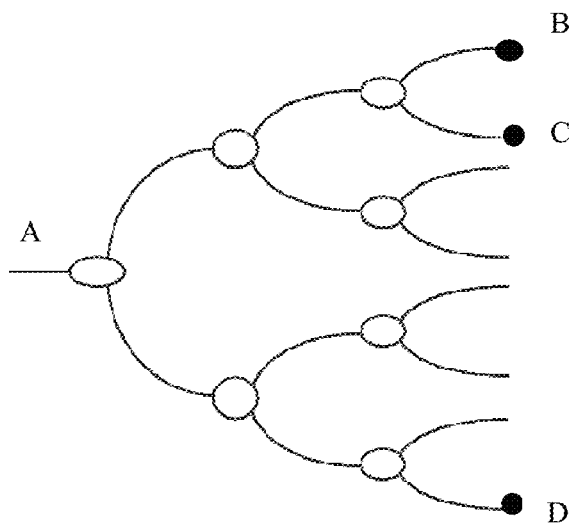
FIG. 17 to FIG. 19 are schematic diagrams of a 1×8 cascaded optical switch structure, a 1×32 cascaded optical switch structure, and a 1×64 cascaded optical switch structure, respectively.
Figure 18:
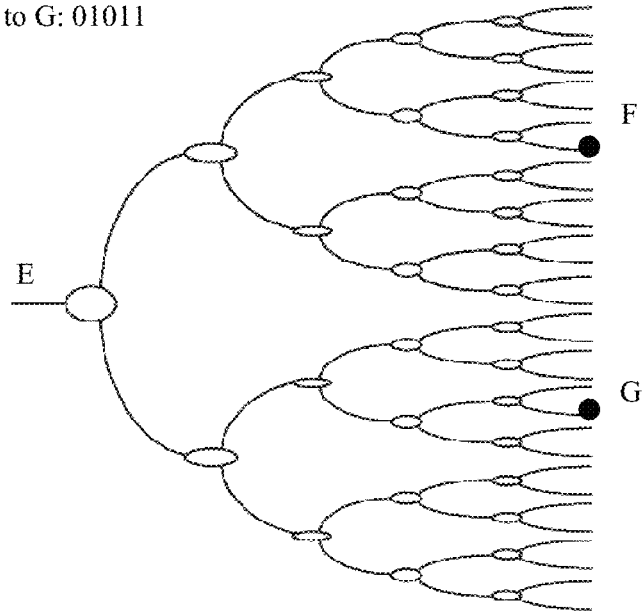
Figure 19:
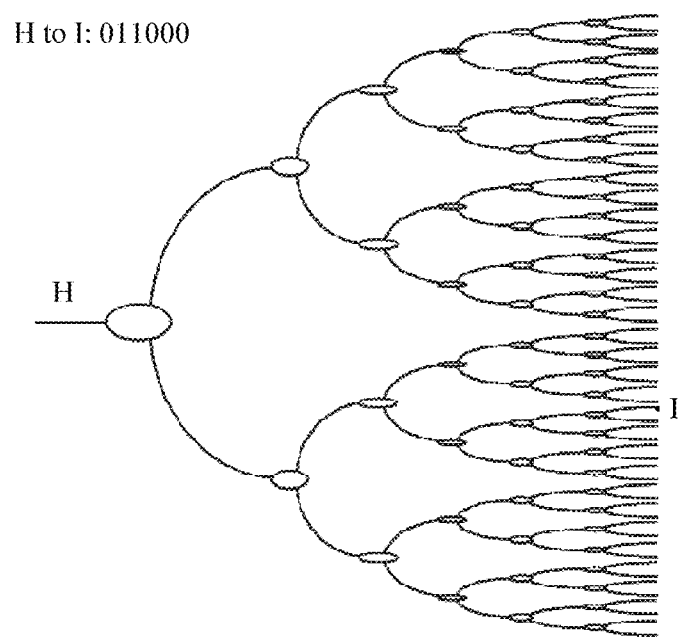

For another example, M=2N. FIG. 17 to FIG. 19 are schematic diagrams of a 1×8 cascaded optical switch structure, a 1×32 cascaded optical switch structure, and a 1×64 cascaded optical switch structure, respectively. As shown in FIG. 17 to FIG. 19, a quantity of levels of switches in the 1×8 cascaded optical switch structure is 3, including one second port and eight first ports. For example, the logic control instruction is in, indicating that a connection between a second port A and a first port B is connected, and a connection between the second port A and another first port is disconnected. The logic control instruction is no, indicating that a connection between the second port A and a first port C is connected, and a connection between the second port A and another first port is disconnected. The logic control instruction is 000, indicating that a connection between the second port A and a first port D is connected, and a connection between the second port A and the another first port is disconnected. A quantity of levels of switches in the 1×32 cascaded optical switch structure is 5, including one second port and 32 first ports. For example, the logic control instruction is 11001, indicating that a connection between a second port E and a first port F is connected, and a connection between the second port E and another first port is disconnected. The logic control instruction is own, indicating that a connection between the second port E and a first port G is connected and a connection of the second port E and another first port is disconnected. A quantity of levels of switches in the 1×64 cascaded optical switch structure is 6, including one second port and 64 first ports. For example, the logic control instruction is 011000, indicating that a connection between a second port H and a first port I is connected and a connection between the second port H to another first port is disconnected.

It should be noted that the optical waveguide structure 34 in the optical waveguide module includes only two optical waveguides located at different layers, the first optical waveguide channel, and the optical switch. During actual implementation, at least one of the optical waveguide structures 34 in the optical waveguide module may further include a structure such as a dielectric layer.

In a conventional optical switching device (such as an access site), a fixed optical add/drop multiplexer (FOADM) is used to perform a function of an optical layer of the optical switching device. However, wavelength calibration needs to be performed on all channels of tributary ports in the FOADM. That is, the port is colored, and only the corresponding calibrated wavelength can be uploaded and downloaded for each FOADM of a specific model. As a result, the FOADM has many types of boards, high storage costs, and difficulty in operation and maintenance. For example, if an optical switching device that can transmit 120 wavelengths supports four tributary ports for uploading optical signals and four tributary ports for downloading optical signals, the site needs to be configured with FOADM boards of 30 calibrated wavelengths.

In the related technology, it is also proposed to apply a wavelength selective switching (WSS) technology in a reconfigurable optical add/drop multiplexer (ROADM) system of a backbone network to the optical switching device. However, the WSS is complex to manufacture, has high costs, and therefore is difficult to be used in the optical switching device on a large scale.

According to the optical waveguide module provided in this embodiment of this application, two optical waveguides located at different layers are physically connected to the first optical waveguide channel, and therefore, an insertion loss is effectively reduced compared with that in the FOADM and the WSS. In addition, a line-wavelength optical signal is input through the multiplexer/demultiplexer module, and a line-wavelength optical signal passing through another optical waveguide module is outputs through a line pass-through port (or the line-wavelength optical signal passing through the another optical waveguide module is received through the line pass-through port, and the line-wavelength optical signal is output through the multiplexer/demultiplexer module). The first tributary wave add/drop structure can upload a local-wavelength optical signal or download the line-wavelength optical signal, so that transmission of the line-wavelength optical signal in one direction can be implemented. Further, the optical switch is disposed in the optical waveguide module. For example, each optical waveguide structure includes at least one optical switch, routing of an optical signal is implemented without calibrating a wavelength corresponding to the tributary port, and colorless wave add/drop is implemented.

As shown in FIG. 16, the optical signals of a group of wavelengths input from the line port may be separated by the multiplexer/demultiplexer module, and an optical signal of a pass-through wavelength may be output through the connector, or an optical signal of a tributary wavelength may be output through the first tributary wave add/drop structure or the second tributary wave add/drop structure. A wavelength in the entire optical waveguide module does not need to be calibrated, and colorless wavelength pass-through and local downloading can be implemented through a simple structure.

Figure 20:
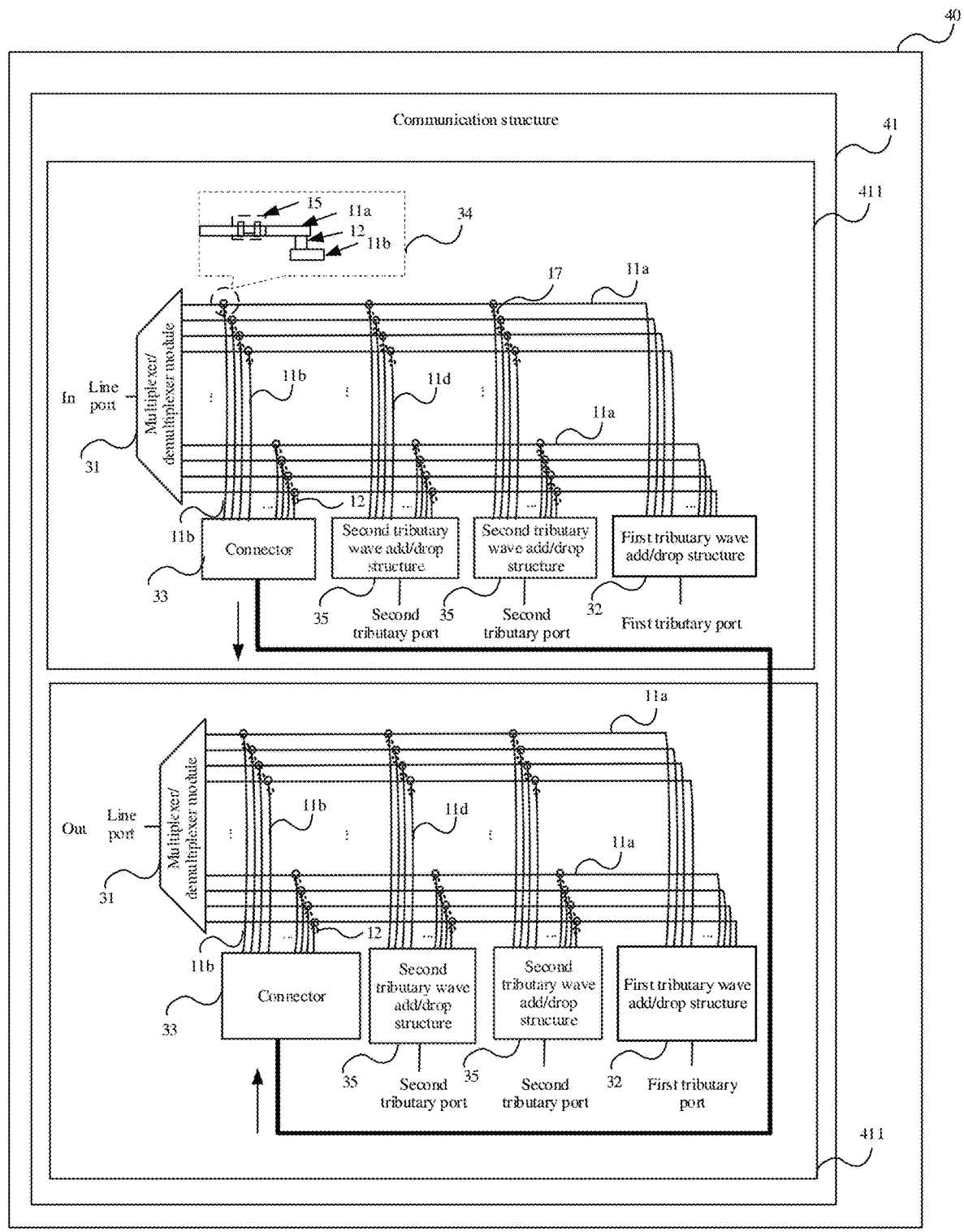
FIG. 20 is a schematic diagram of an optical switching device according to an illustrative embodiment of this application.

FIG. 20 is a schematic diagram of an optical switching device 40 according to an illustrative embodiment of this application. The optical switching device may be an access site. As shown in FIG. 20, the optical switching device 40 includes:

a communication structure 41. The communication structure 41 includes two optical waveguide modules 411. The two optical waveguide modules 411 are connected through respective line pass-through ports, and the line ports of the two optical waveguide modules 411 each are connected to a line in a different direction. For example, two line ports are connected to west w and east e lines. For a structure of each optical waveguide module 411, refer to the structure of the optical waveguide module 30 described above. Optionally, a tributary port of a tributary wave add/drop structure (for example, a first tributary wave add/drop structure or a second tributary wave add/drop structure) of one of the two optical waveguide modules 411 is a wave add port for uploading an optical signal, and a tributary port of a tributary wave add/drop structure (for example, a first tributary wave add/drop structure or a second tributary wave add/drop structure) of the other optical waveguide module 411 is a drop port for downloading an optical signal.

Figure 21:
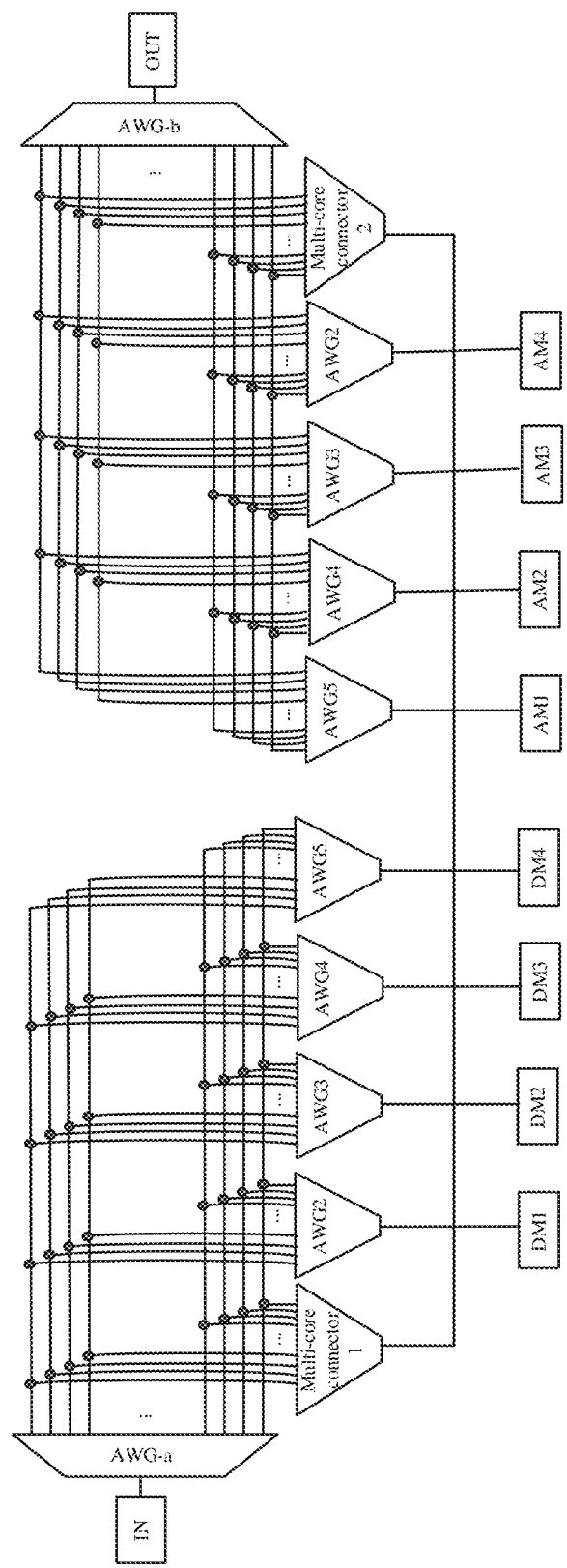
FIG. 21 to FIG. 25 are schematic diagrams of several communication structures according to an embodiment of this application.
Figure 22:
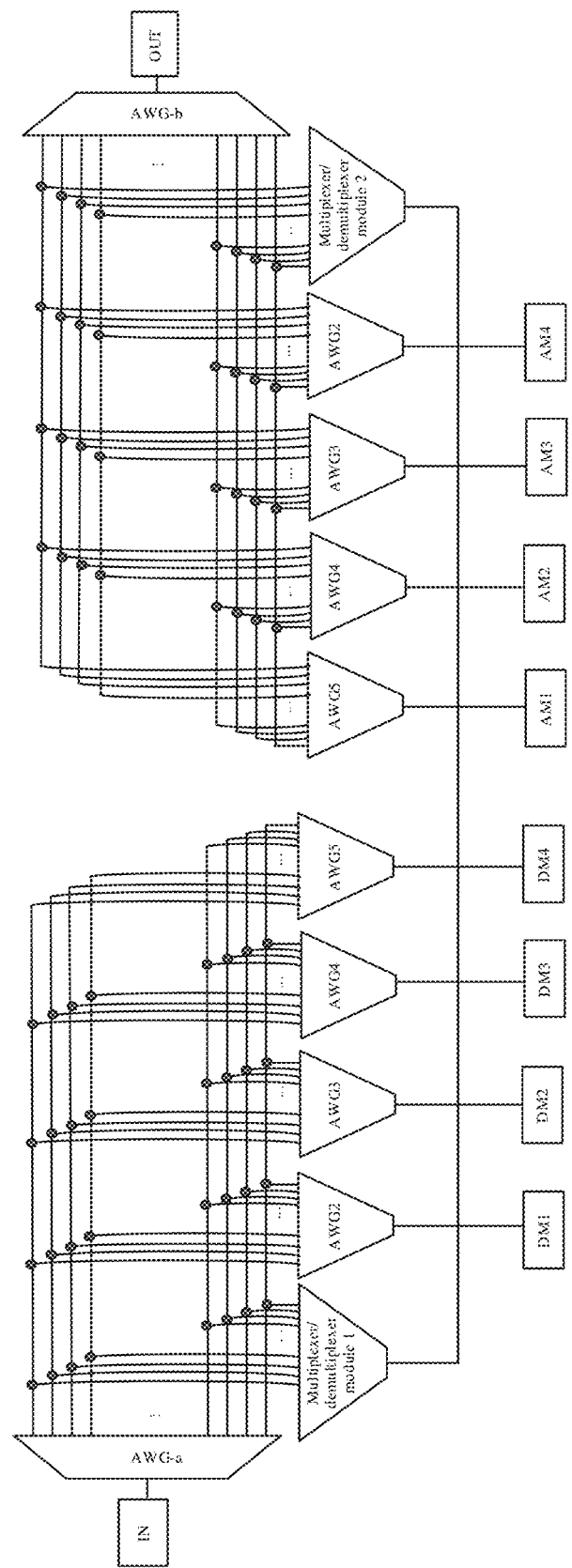
Figure 23:
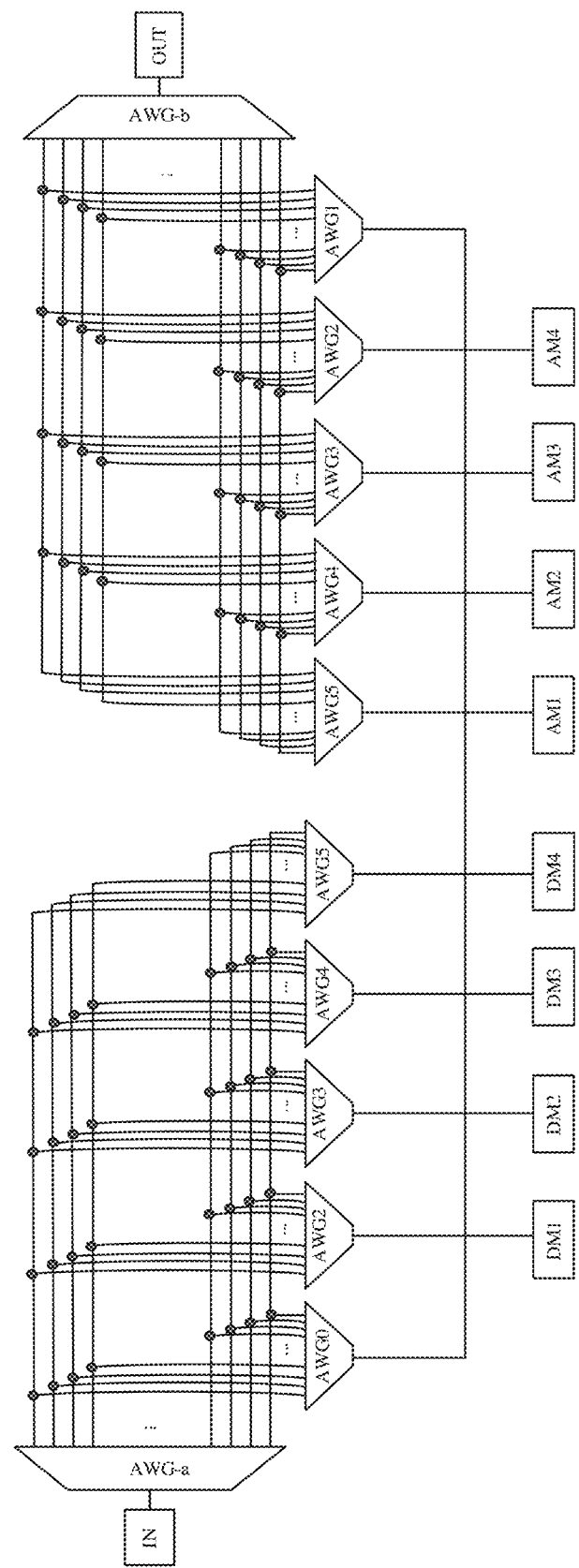
Figure 24:
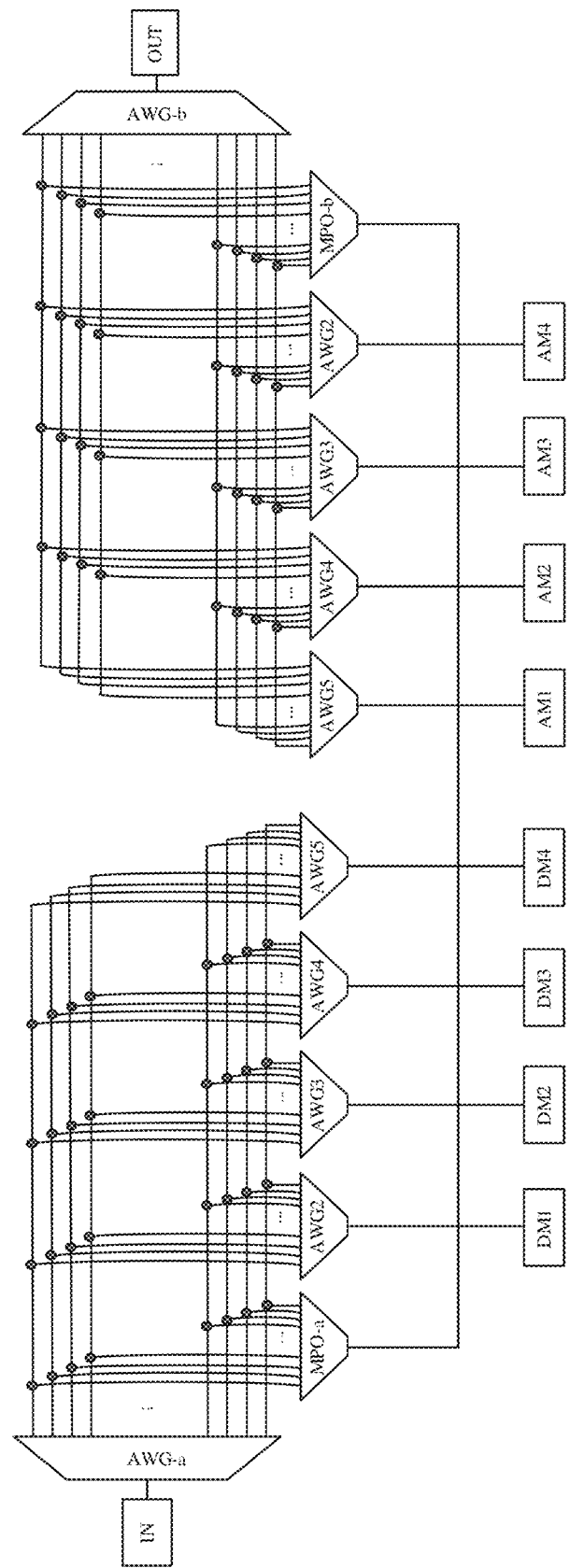
Figure 25:
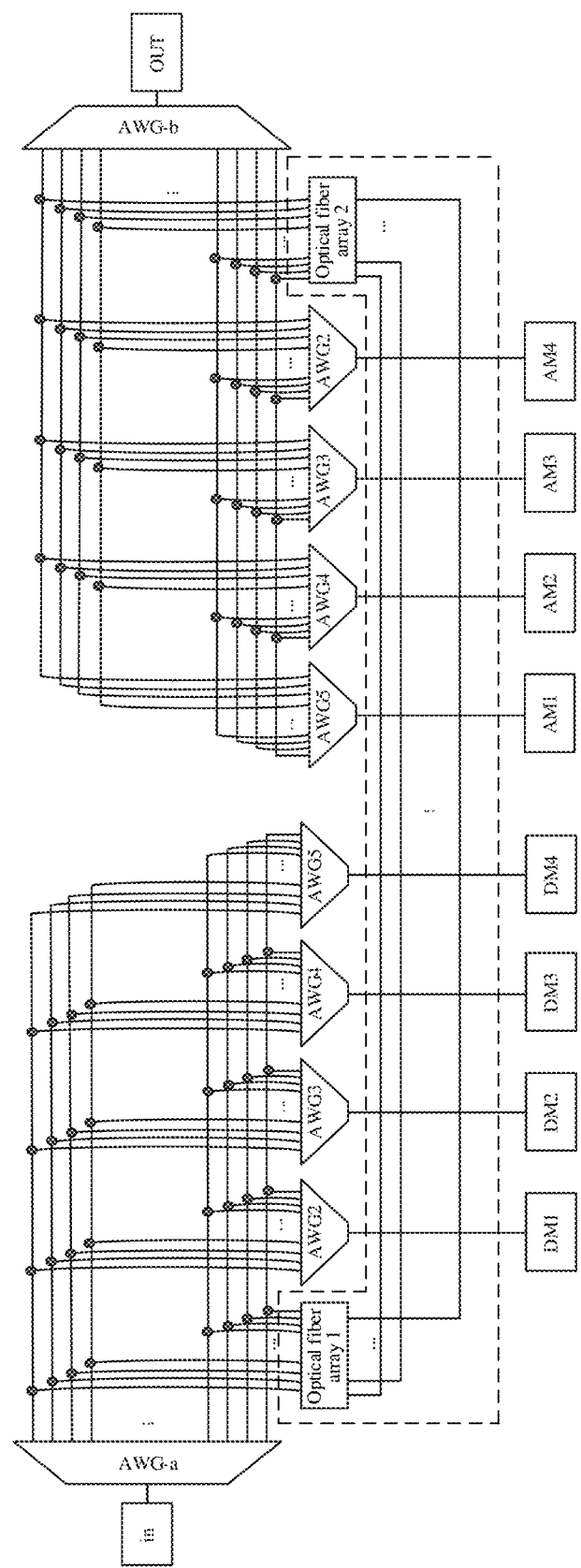

In this embodiment of this application, implementations of connectors of the two optical waveguide modules in the communication structure 41 are different, and connection manners of the two optical waveguide modules are also different. FIG. 21 to FIG. 25 are schematic diagrams of several communication structures according to an embodiment of this application. FIG. 21 to FIG. 25 are respectively schematic diagrams of communication structures in which connectors are a multiplexer/demultiplexer module, an AWG, an optical cable with an MPO, and an optical fiber array with an optical fiber ferrule. Connectors of two optical waveguide modules in FIG. 21 are multi-core connectors, which are a multi-core connector 1 and a multi-core connector 2, and line pass-through ports of the multi-core connector 1 and the multi-core connector 2 are connected. Connectors of two optical waveguide modules in FIG. 22 are multiplexer/demultiplexer modules 1 and 2. Optionally, as shown in FIG. 23, it is assumed that the multiplexer/demultiplexer module 1 is AWG0, the multiplexer/demultiplexer module 2 is AWG1, and line pass-through interfaces of the AWG0 and the AWG1 are connected through an optical fiber. Connectors of two optical waveguide modules in FIG. 24 are multi-core connectors connected to optical cables, and are MPO-a and MPO-b. Line pass-through ports of the MPO-a and the MPO-b are connected through the optical cables. Connectors of two optical waveguide modules in FIG. 25 are optical fiber ferrules (not shown in FIG. 25) connected to optical fiber arrays. An optical fiber array 1 and an optical fiber array 2 connected to the optical fiber ferrules in the two optical waveguide modules are one-to-one connected. In FIG. 21 to FIG. 25, it is assumed that the multiplexer/demultiplexer modules connected to lines in the two optical waveguide modules are AWG-a and AWG-b, and the first tributary wave add/drop structure and the second tributary wave add/drop structure are AWGs. A line port of the AWG-a is an optical signal inlet (in) of the line, and a line port of the AWG-b is an optical signal outlet (out). The second tributary wave add/drop structure of each optical waveguide module includes AWG2 to AWG4, and the first tributary wave add/drop structure is AWG5. Tributary ports of the AWG2 to the AWG (including first tributary ports of the AWG2 to the AWG4 and a second tributary port of the AWG5) in the optical waveguide module in which the AWG-a is located are down wave ports DM1 to DM4. Tributary ports of the AWG2 to the AWG (including first tributary ports of the AWG2 to the AWG4 and a second tributary port of the AWG5) in the optical waveguide module in which the AWG-b is located are add wave ports AM4 to AM1. It should be noted that the structures in FIG. 21 and FIG. 25 are merely illustrative, and structures and quantities of tributary wave add/drop structures and multiplexer/demultiplexer modules connected to a line are not limited in embodiments of this application.

Figure 26:
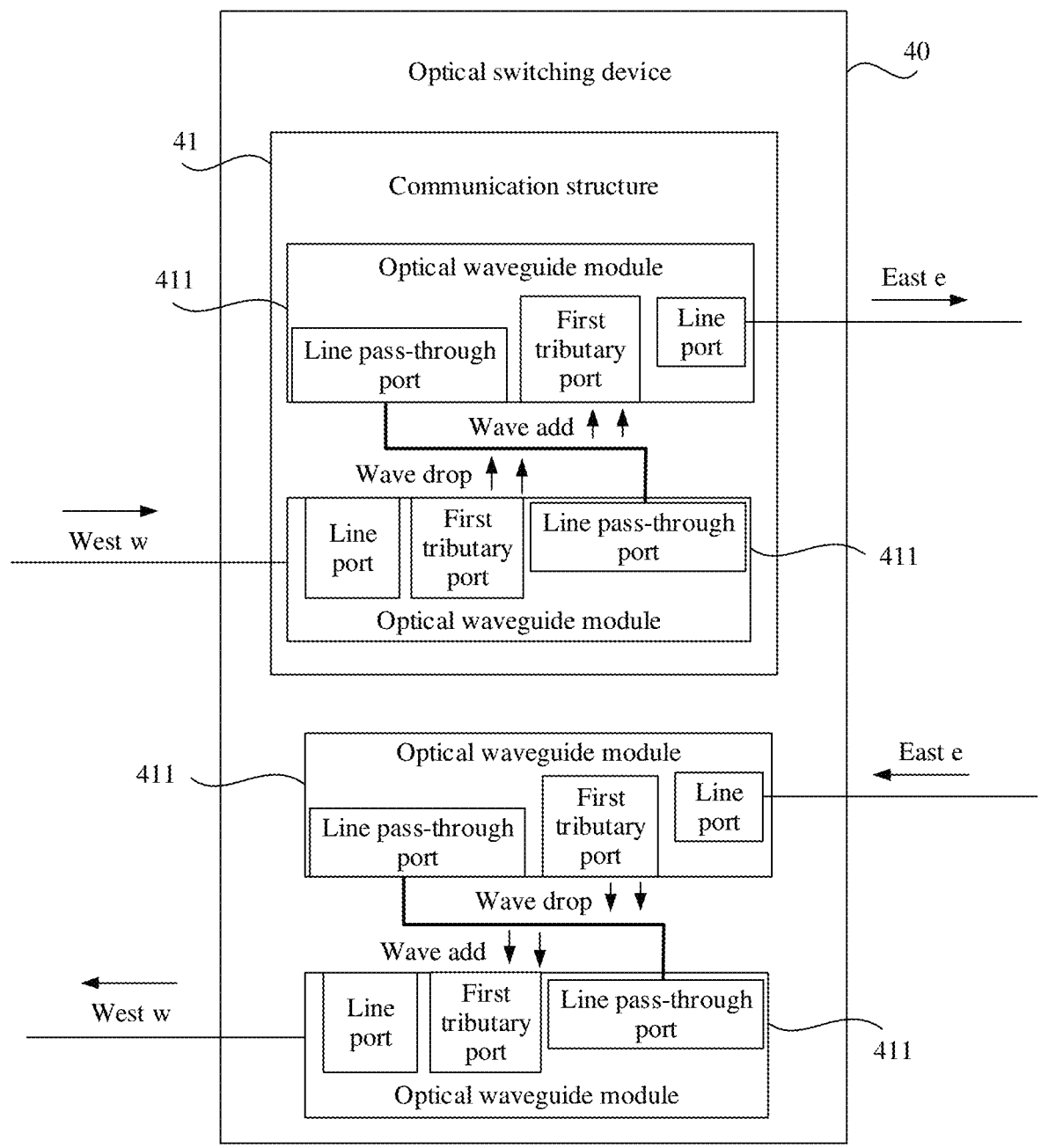
FIG. 26 is a schematic diagram of a structure of another optical switching device according to an illustrative embodiment of this application.

FIG. 26 is a schematic diagram of a structure of another optical switching device according to an illustrative embodiment of this application. As shown in FIG. 26, the optical switching device 40 includes two communication structures 41, and optical signal transmission directions of lines connected to line ports of the two communication structures 41 are opposite. Optionally, the optical switching device 40 may further include a controller for controlling a transmission direction of an optical signal to implement routing of the optical signal. The controller is connected to an optical switch in the optical switching device 40, and performs routing control by controlling the optical switch. When the tributary wave add/drop structure in the optical switching device is a cascaded optical switch structure (for example, the cascaded optical switch structured shown in FIG. 17 to FIG. 19), the controller may also generate a logic control instruction to control the cascaded optical switch structure. When the optical waveguide module 30 is an optical chip, the controller is integrated on or disposed outside the optical chip. The optical switching device 40 may be an integral chip, or a collection of chips formed by connecting at least two chips.

Figure 27:
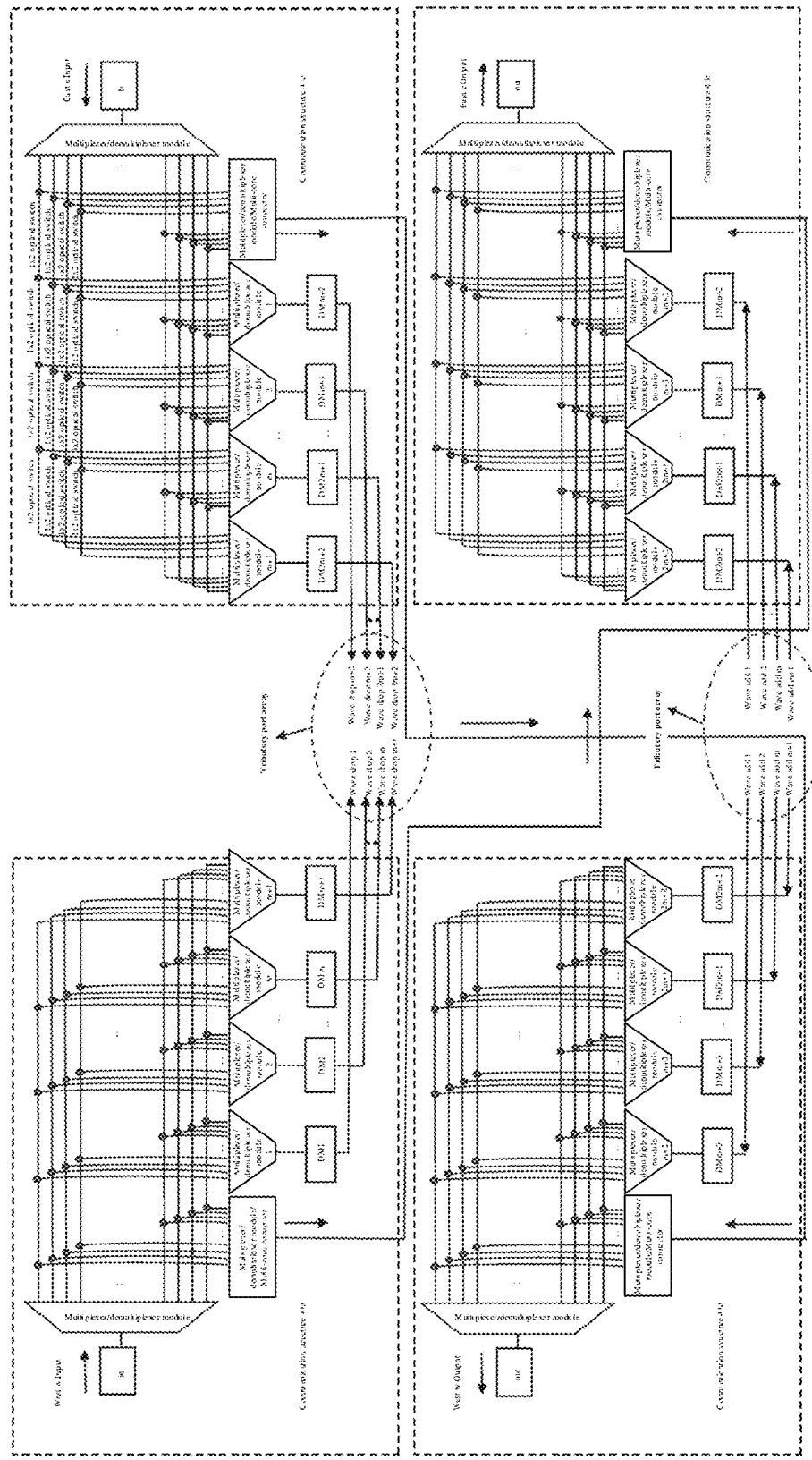
FIG. 27 is a schematic diagram of a structure of still another optical switching device according to an illustrative embodiment of this application.

FIG. 27 is a schematic diagram of a structure of an optical switching device 40 according to an embodiment of this application. As shown in FIG. 27, it is assumed that the optical switching device includes four communication structures, which are communication structures 41a to 41d. On a line side, the communication module 41a and the communication module 41b support optical signal transmission in the west w. The communication module 41c and the communication module 41d support optical signal transmission to the east e. A line port of a multiplexer/demultiplexer module of the communication module 41a receives an optical signal in the west w, a multiplexer/demultiplexer module of the communication module 41b outputs an optical signal in the east e, and line pass-through ports of connectors of the communication module 41a and the communication module 41b are interconnected. A line port of the multiplexer/demultiplexer module of the communication module 41c receives an optical signal in the east e, the multiplexer/demultiplexer module of the communication module 41d outputs an optical signal in the west w, and line pass-through ports of the communication module 41c and the communication module 41d are interconnected. On a tributary side, second tributary ports of m second tributary wave add/drop structures and a first tributary port of one first tributary wave add/drop structure of the communication module 41a, and first tributary ports of m second tributary wave add/drop structures and a second tributary port of one first tributary wave add/drop structure of the communication module 41c constitute 2m+2 tributary ports for downloading line wavelengths. Second tributary ports of m second tributary wave add/drop structures and a first tributary port of one first tributary wave add/drop structure of the communication module 41b, and second tributary ports of m second tributary wave add/drop structures and a first tributary port of one first tributary wave add/drop structure of the communication module 41d constitute 2m+2 tributary ports for uploading local wavelengths. In FIG. 27, it is assumed that the connector is a multiplexer/demultiplexer module or a multi-core connector, and it is assumed that both the first tributary wave add/drop structure and the second tributary wave add/drop structure are multiplexer/demultiplexer modules. However, a specific implementation of the connector and the tributary wave add/drop structure is not limited. It should be noted that the optical switch is not drawn in FIG. 27. For a position and structure of the optical switch, refer to the foregoing embodiments.

According to the optical switching device provided in this embodiment of this application, the line side has a line wavelength pass-through function in the west w and the east e, and free and unobstructed wave add/drop of all wavelengths can be implemented between the two line directions and the local device, so that an optical waveguide system having a simple structure can be constructed. For example, the optical waveguide system is an optical transmission network, such as a wavelength division network or a metropolitan area network.

According to the optical switching device provided in this embodiment of this application, two optical waveguides located at different layers are physically connected to the first optical waveguide channel, and therefore, an insertion loss is effectively reduced compared with that in the FOADM and the WSS. In addition, one optical waveguide module in each communication structure can input a line-wavelength optical signal through a multiplexer/demultiplexer module, and output, through a line pass-through port, the line-wavelength optical signal passing through another optical waveguide module. The another optical waveguide module inputs the line-wavelength optical signal through a line pass-through port, and outputs the line-wavelength optical signal through a multiplexer/demultiplexer module, to implement transmission of the line-wavelength optical signal in one direction. In addition, a tributary port of each optical waveguide module in the communication structure also supports uploading of a local-wavelength optical signal or downloading of a line-wavelength optical signal. Further, the optical switch is disposed in the optical waveguide module. For example, each optical waveguide structure includes at least one optical switch, routing of an optical signal is implemented without calibrating a wavelength corresponding to the tributary port, and colorless wave add/drop is implemented. When the optical switching device includes two communication structures, transmission of a line-wavelength optical signal in two directions can be implemented. In this way, all functions of the optical switching device can be implemented through a simple structure.

Compared with an optical switching device in which the FOADM is disposed, the optical switching device provided in embodiments of this application imposes no limitation on a quantity of wavelengths, wavelength directions, and wavelength combination manners in lines that are to and from the optical switching device and that meets the application scope of the optical waveguide system (for example, an optical waveguide system adapts to a dense wavelength division multiplexing (DWDM) optical fiber of 120 wavelengths in C band, so that the wavelength of the line is within the range of the 120 wavelengths in the C band, and the optical switching device does not need to be changed or configured in hardware no matter a quantity of wavelengths, wavelength directions, and a combination of wavelengths change). In this way, flexibility of the optical switching device can be effectively improved, operation and maintenance costs can be reduced, and deployment efficiency can be accelerated. In addition, because the optical switching device meets colorless wave add/drop, one type of optical switching device may be applied to the entire looped network, to improve the applicability of the optical switching device, implement normalization of devices, and reduce storage costs.

Figure 28:
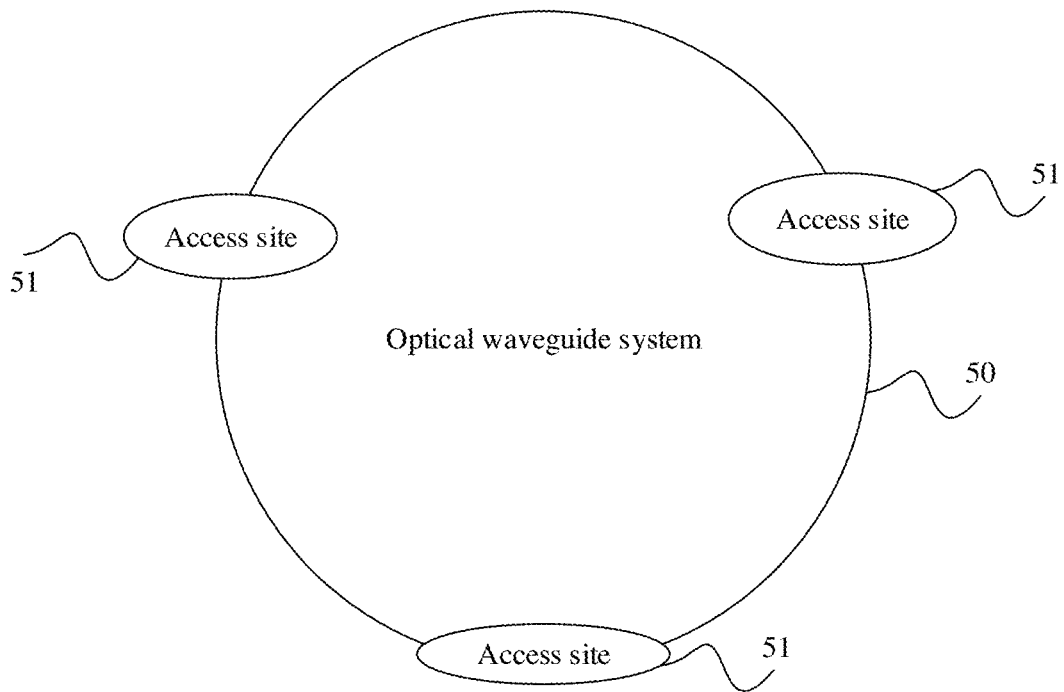
FIG. 28 is a schematic diagram of a structure of an optical waveguide system according to an illustrative embodiment of this application.

FIG. 28 is a schematic diagram of a structure of an optical waveguide system 50 according to an illustrative embodiment of this application. As shown in FIG. 28, the optical waveguide system includes at least two optical switching devices 51, and the at least two optical switching devices 51 are connected through an optical fiber. At least one optical switching device 51 may use the structure of the optical switching device provided in embodiments of this application. For the structure, refer to the optical switching device 40. Optionally, each optical switching device in the optical waveguide system may use the structure of the optical switching device 40. For example, the optical waveguide system may be a looped network structure as shown in FIG. 14, and for example, may be a wavelength division network or a metropolitan area network.

According to the optical waveguide system provided in this embodiment of this application, in the optical switching device, two optical waveguides located at different layers are physically connected to a first optical waveguide channel, and therefore, an insertion loss is effectively reduced compared with that in an FOADM and WSS. In addition, each optical switching device implements colorless wave add/drop, and applicability of the optical switching device is high. This implements normalization of devices and reduces storage costs.

Figure 29:
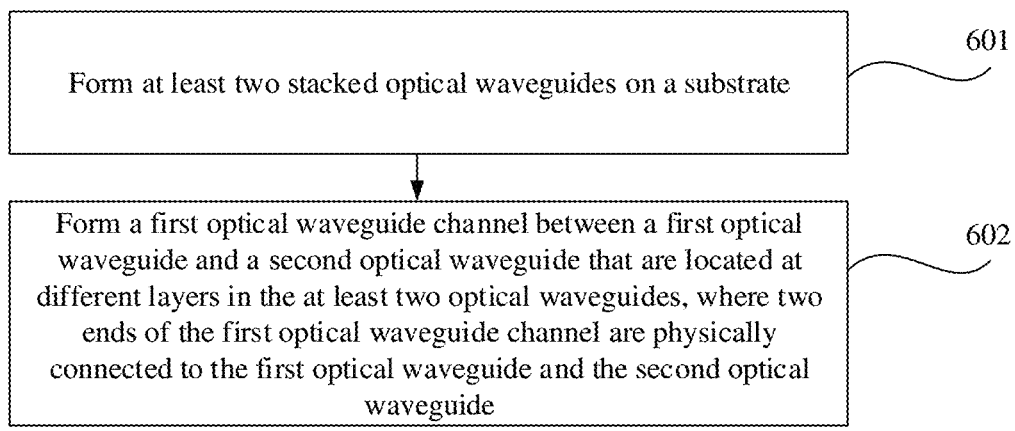
FIG. 29 is a schematic flowchart of a method for manufacturing an optical waveguide structure according to an illustrative embodiment of this application.

FIG. 29 is a schematic flowchart of a method for manufacturing an optical waveguide structure according to an illustrative embodiment of this application. As shown in FIG. 29, the method includes the following steps:

S601: Form at least two stacked optical waveguides on a substrate.

S602: Form a first optical waveguide channel between a first optical waveguide and a second optical waveguide that are located at different layers in the at least two optical waveguides, where two ends of the first optical waveguide channel are physically connected to the first optical waveguide and the second optical waveguide.

In conclusion, according to the method for manufacturing an optical waveguide structure provided in this embodiment of this application, the first optical waveguide channel is physically connected to two optical waveguides located at different layers, to implement optical signal transmission between different optical waveguides, so that fewer co-layer cross optical waveguides are used, and crossing of optical waveguides at a same layer is reduced. Therefore, a transmission insertion loss of an optical signal is reduced, and transmission quality of an optical signal is improved. In addition, because the optical waveguides of the optical waveguide structure are disposed in a stacked manner, and are no longer limited to be on one plane, integration of the optical waveguide structure can be effectively ensured, and miniaturization of the optical waveguide structure is implemented.

Figure 30:
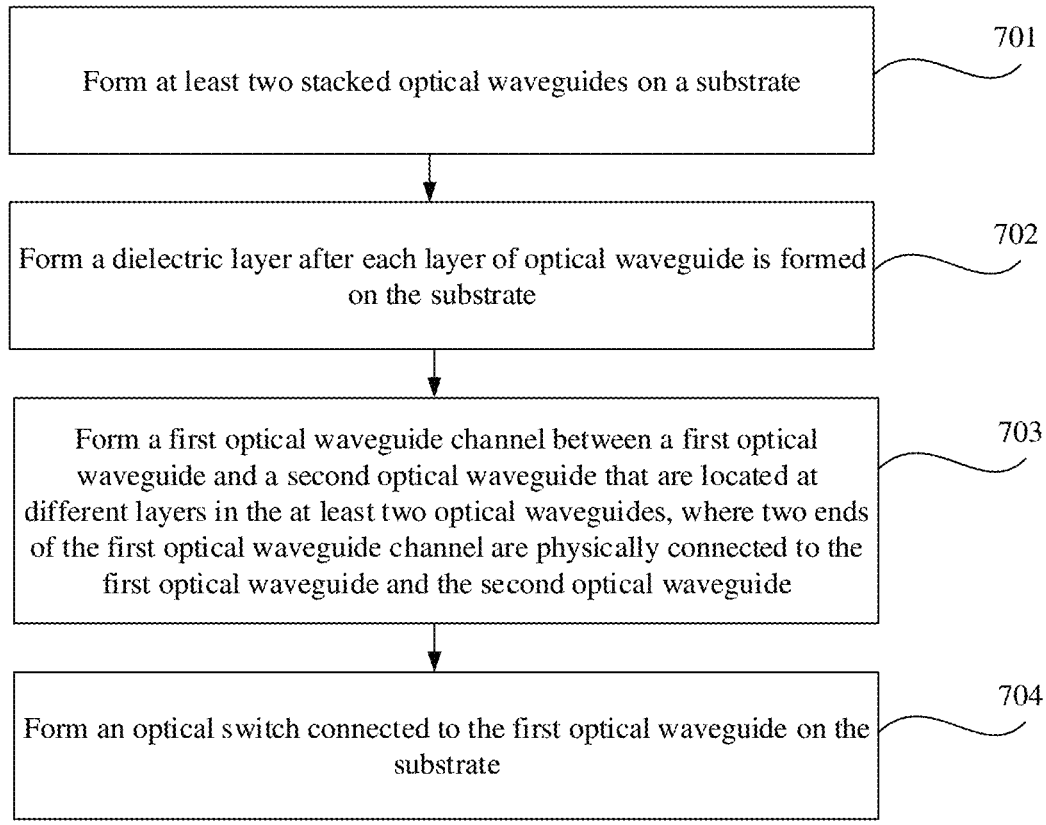
FIG. 30 is a schematic flowchart of another method for manufacturing an optical waveguide structure according to an illustrative embodiment of this application.

FIG. 30 is a schematic flowchart of another method for manufacturing an optical waveguide structure according to an illustrative embodiment of this application. As shown in FIG. 30, the method includes the following steps.

S701: Form at least two stacked optical waveguides on a substrate.

For a manufacturing process of each layer of optical waveguide, refer to a silicon light process or a PLC manufacturing process. For example, forming an $f^{th}$ layer of optical waveguide on the substrate is used as an example, where f is a positive integer, and the $f^{th}$ layer of optical waveguide includes at least one optical waveguide. A manufacturing process of the $f^{th}$ layer of optical waveguide includes: forming an optical waveguide material layer on the substrate by a deposition, coating, or sputtering process; and performing a patterning process once on the optical waveguide material layer to obtain the $f^{th}$ layer of optical waveguide. The primary patterning process includes photoresist coating, exposure, development, etching, and photoresist stripping.

S702: Form a dielectric layer after each layer of optical waveguide is formed on the substrate.

A first optical waveguide channel between the two optical waveguides is located at a dielectric layer between the two optical waveguides, and a refractive index of the dielectric layer is less than a refractive index of the first optical waveguide channel. After each layer of optical waveguide is formed on the substrate, a dielectric layer may be formed by a deposition, coating, or sputtering process.

S703: Form a first optical waveguide channel between a first optical waveguide and a second optical waveguide that are located at different layers in the at least two optical waveguides, where two ends of the first optical waveguide channel are physically connected to the first optical waveguide and the second optical waveguide.

Figure 31:
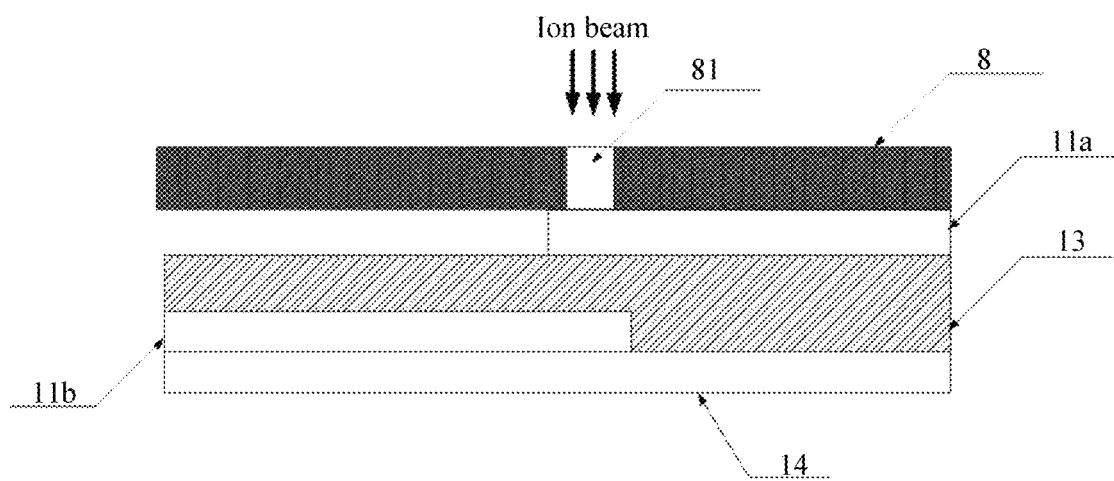
FIG. 31 is a schematic diagram of a process for manufacturing a first optical waveguide channel according to an illustrative embodiment of this application.
Figure 32:
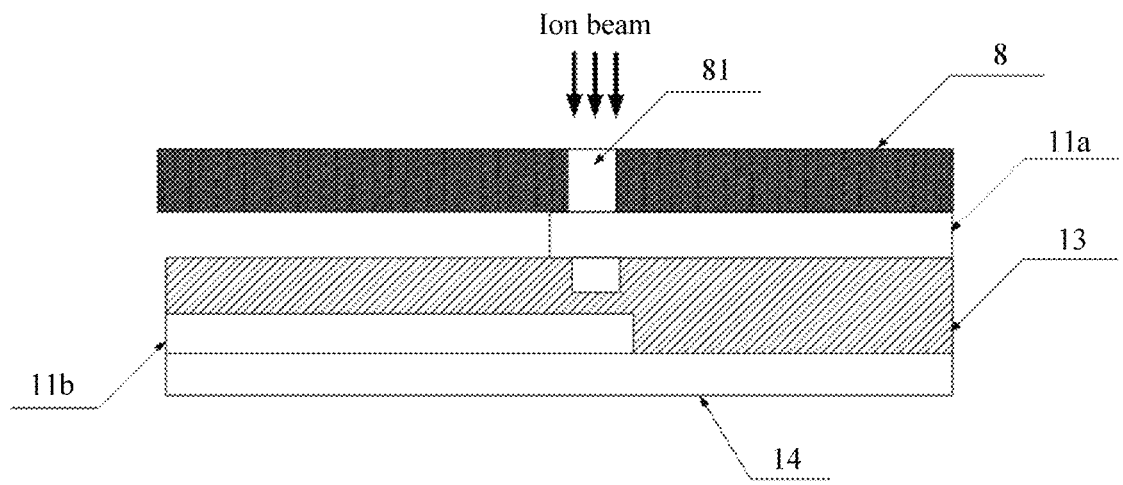
FIG. 32 is a schematic diagram of another process for manufacturing a first optical waveguide channel according to an illustrative embodiment of this application.

In this embodiment of this application, the first optical waveguide channel may be formed by performing ion doping on the dielectric layer between the first optical waveguide and the second optical waveguide. The ion doping process may have a plurality of implementations. This embodiment of this application describes the following optional examples:

In a first optional example, the first optical waveguide is farther from the substrate than the second optical waveguide. The first optical waveguide channel may be formed by performing ion doping on a side on which the first optical waveguide is located. The process includes: After the first optical waveguide is formed, a mask plate is disposed on a surface that is of the first optical waveguide and that is away from the substrate. The mask plate has a hollow region. Influence of the ion doping process on a non-doped region (that is, a region outside the hollow region of the mask plate) of the first optical waveguide can be avoided by covering of the mask plate. For example, the mask plate may be a photoresist mask plate or a metal mask plate. Ion doping is performed on the dielectric layer between the first optical waveguide and the second optical waveguide through a portion of the first optical waveguide exposed from the hollow region of the mask plate, to form the first optical waveguide channel between the two optical waveguides. FIG. 31 is a schematic diagram of a process for manufacturing a first optical waveguide channel according to an illustrative embodiment of this application. As shown in FIG. 31, it is assumed that a second optical waveguide 11b, a dielectric layer 13, and a first optical waveguide 11a are sequentially formed on a substrate 14. A mask plate 8 is disposed on a side that is of the first optical waveguide 11a and that is away from the substrate, that is, "above" on FIG. 31. After the mask plate 8 is disposed, a portion of the first optical waveguide 11a is exposed from a hollow region 81 of the mask plate, and the portion of the first optical waveguide 11a exposed from the hollow region of the mask plate is irradiated by an ion gun. The ion gun is configured to form a high-speed ion beam by accelerating ions generated by an ion source. The ion beam enters the first optical waveguide 11a and the dielectric layer 13 sequentially through the exposed portion, and a first optical waveguide channel 12 is formed at the dielectric layer 13 between the first optical waveguide 11a and the second optical waveguide 11b. FIG. 32 is a schematic diagram of another process for manufacturing a first optical waveguide channel according to an illustrative embodiment of this application. FIG. 32 shows a schematic structure during forming of the first optical waveguide channel 12. Thereafter, the mask plate 8 is removed. The optical waveguide structure in which the first optical waveguide channel 12 is formed is shown in FIG. 8.

Figure 33:
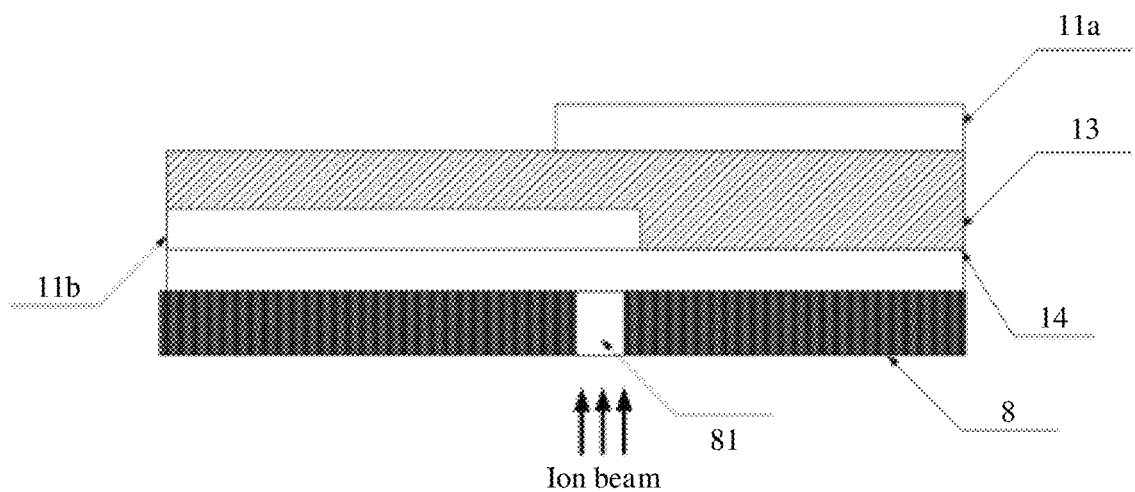
FIG. 33 is a schematic diagram of still another process for manufacturing a first optical waveguide channel according to an illustrative embodiment of this application.

In a second optional example, the first optical waveguide is farther from the substrate than the second optical waveguide. The first optical waveguide channel may be formed by performing ion doping on a side on which the second optical waveguide is located. The process includes: After the first optical waveguide is formed, a mask plate is disposed on a surface that is of the substrate and that is away from the second optical waveguide. The mask plate has a hollow region. Ion doping is performed on the dielectric layer between the first optical waveguide and the second optical waveguide through a portion of the substrate exposed from the hollow region of the mask plate, to form the first optical waveguide channel between the two optical waveguides. FIG. 33 is a schematic diagram of still another process for manufacturing a first optical waveguide channel according to an illustrative embodiment of this application. As shown in FIG. 33, it is assumed that a second optical waveguide 11b, a dielectric layer 13, and a first optical waveguide 11a are sequentially formed on a substrate 14. A mask plate 8 is disposed on a side that is of the substrate 14 and that is away from the second optical waveguide 11b, that is, "below" on FIG. 33. After the mask plate 8 is disposed, a portion of the substrate 14 is exposed from a hollow region 81 of the mask plate, and the portion of the substrate 14 exposed from the hollow region of the mask plate is irradiated by an ion gun. The ion gun is configured to form a high-speed ion beam by accelerating ions generated by the ion source. The ion beam enters the substrate 14, the second optical waveguide 11b, and the dielectric layer 13 sequentially through the exposed portion, and a first optical waveguide channel 12 is formed at the dielectric layer 13 between the first optical waveguide 11a and the second optical waveguide 11b. Thereafter, the mask plate 8 is removed. The optical waveguide structure in which the first optical waveguide channel 12 is formed is shown in FIG. 8.

The first optical waveguide channel formed by the ion doping process provided in the foregoing two optional examples is an ion doped channel. As shown in FIG. 8, a substrate of the first optical waveguide channel 12 and a substrate of the dielectric layer 13 have a same lattice atom arrangement, for example, both are hexahedral or octahedral. The lattice atomic arrangement structure of the first optical waveguide channel 12 does not change relative to the dielectric layer 13, but at least some atoms are replaced.

It should be noted that FIG. 33 is an illustration of the ion doping process in which the ion gun irradiates the mask plate from below. According to this embodiment of this application, during actual implementation, the substrate 14 on which the second optical waveguide 11b, the dielectric layer 13, and the first optical waveguide 11a are formed may be inverted, and the inverted substrate 14 is positioned on the top. Then, the mask plate 8 is disposed on the side that is of the substrate 14 and that is away from the second optical waveguide 11b, and the ion beam is irradiated. After the ion doping is completed, the substrate 14 on which the second optical waveguide 11b, the dielectric layer 13, and the first optical waveguide 11a are formed may be inverted again, so that the substrate 14 is positioned on the bottom. In this way, the ion gun irradiates the mask plate from above for ion doping, and the operation is easier.

In the foregoing two optional examples, when the mask plate is disposed, in a stacking direction of the first optical waveguide and the second optical waveguide, the hollow region of the mask plate may be located in an overlapping region (a shadow region in FIG. 4 and FIG. 5) of the first optical waveguide and the second optical waveguide, so that an orthographic projection of the first optical waveguide channel 12 on the substrate is located in an orthographic projection of the hollow region of the mask plate on the substrate. This facilitates execution of the ion doping process.

In this embodiment of this application, for the process of forming the first optical waveguide channel by performing ion doping between every two layers of optical waveguides, refer to the process of forming the first optical waveguide channel by performing ion doping between the first optical waveguide and the second optical waveguide in the foregoing two optional examples.

After forming the first optical waveguide channel, a process such as annealing may be performed to improve stability of the first optical waveguide channel.

S704: Form an optical switch connected to the first optical waveguide on the substrate.

For a process of forming the optical switch connected to the first optical waveguide on the substrate, refer to the related technology. Details are not described in this embodiment of this application.

It should be noted that when the optical waveguide structure is an optical chip, the method for manufacturing the optical waveguide structure further includes a chip packaging process. For other two optical waveguides located at different layers and a manufacturing process of a first optical waveguide channel therebetween in the optical waveguide structure, refer to the first optical waveguide, the second optical waveguide, and the manufacturing process of the first optical waveguide channel therebetween. Details are not described again in this embodiment of this application.

It should be noted that the order of the steps of the method for manufacturing an optical waveguide structure provided in this embodiment of this application may be appropriately adjusted, and the steps may be correspondingly added or deleted according to a situation. Any method that can be readily figured out by a person skilled in the art within the technical scope disclosed in this application shall fall within the protection scope of this application, and therefore details are not described again.

In conclusion, according to the method for manufacturing an optical waveguide structure provided in this embodiment of this application, the first optical waveguide channel is physically connected to two optical waveguides located at different layers, to implement optical signal transmission between different optical waveguides, so that fewer co-layer cross optical waveguides are used, and crossing of optical waveguides at a same layer is reduced. Therefore, a transmission insertion loss of an optical signal is reduced, and transmission quality of an optical signal is improved. In addition, because the optical waveguides of the optical waveguide structure are disposed in a stacked manner, and are no longer limited to be on one plane, integration of the optical waveguide structure can be effectively ensured, and miniaturization of the optical waveguide structure is implemented.

It may be clearly understood by a person skilled in the art that, for the purpose of convenient and brief description, for specific steps of the described method, reference may be made to a corresponding process in the foregoing apparatus embodiment, and details are not described herein again The term "and/or" in this application describes only an association relationship for describing associated objects and represents that three relationships may exist. For example, A and/or B may represent the following three cases: Only A exists, both A and B exist, and only B exists. The term "at least one" represents one or at least two. In this application, the terms "first" and "second" are only used for descriptive purposes and shall not to be understood as an indication or an implication of relative importance. The term "at least two" means two or more unless expressly defined otherwise. "A refers to B" means that A is the same as B, or A is a simple variant of B.

It should be noted that in the drawings, the sizes of the layers and regions may be exaggerated for clarity of illustration. It may be understood that when an element or layer is "on" another element or layer, the element or layer may be directly on the other element or there may be an intermediate layer. In addition, it may be understood that when an element or layer is "below" another element or layer, the element or layer may be directly below the other element or there may be an intermediate layer or element. In addition, it is also understood that when a layer or element is "between" two layers or two elements, the layer or element may be the only layer between two layers or two elements, or there may be more than one intermediate layer or element. Similar reference numerals indicate similar elements in this application. Two optical waveguides are located at different layers, which means that the two optical waveguides are not coplanar. Vertical distances between the two optical waveguides and a same plane are different. For example, the plane is a plane on which a substrate is located.

In practical application, due to influence of an error in an optical waveguide manufacturing process, strict verticality and parallelism cannot be achieved, and a size may also have errors. The parallelism, verticality, size described in embodiments of this application are approximate verticality, parallelism, and sizes. For example, the verticality in embodiments of this application may be an included angle of 87 degrees, 88 degrees, 91 degrees, 93 degrees, and the parallelism may be an included angle of 2 degrees, 3 degrees, 5 degrees.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, a compact disc, or the like.

The foregoing description is merely optional embodiments of this application, but is not intended to limit this application. Any modification, equivalent replacement, or improvement made without departing from the spirit and principle of this application shall fall within the protection scope of this application.

What is claimed is:

1. An optical waveguide structure, comprising:
    at least two optical waveguides disposed in a stacked manner, wherein the at least two optical waveguides comprise a first optical waveguide and a second optical waveguide, and the first optical waveguide and the second optical waveguide are located at different layers of the optical waveguide structure, and wherein the first optical waveguide is located at an upper layer of the second optical waveguide;
    a first optical waveguide channel disposed between the first optical waveguide and the second optical waveguide, wherein a first end of the first optical waveguide channel is physically connected to the first optical waveguide and a second end of the first optical waveguide channel is physically connected to the second optical waveguide; and
    at least two optical switches, a quantity of optical switches connected to the first optical waveguide is the same as a quantity of first optical waveguide channels connected to the first optical waveguide, and the first optical waveguide channels connected to the first optical waveguide and the optical switches on the first optical waveguide are alternately arranged one by one.

2. The optical waveguide structure according to claim 1, wherein a dielectric layer is disposed between the first optical waveguide and the second optical waveguide in a stacking direction of the first optical waveguide and the second optical waveguide, the first optical waveguide channel is in the dielectric layer, and a refractive index of the dielectric layer is less than a refractive index of the first optical waveguide channel.

3. The optical waveguide structure according to claim 1, wherein a difference between a refractive index of the first optical waveguide channel and a refractive index of the first optical waveguide ranges from 0.5% to 50%.

4. The optical waveguide structure according to claim 1, wherein the at least two optical switches are configured to perform routing of optical signals in a manner that the optical signals are transmitted along the first optical waveguide or transmitted along the second optical waveguide.

5. The optical waveguide structure according to claim 1, wherein in the stacking direction of the first optical waveguide and the second optical waveguide, projections of a first region of the first optical waveguide and a second region of the second optical waveguide overlap on a plane parallel to the first optical waveguide and the second optical waveguide, and the first optical waveguide channel connects the first region and the second region.

6. The optical waveguide structure according to claim 1, wherein the at least two optical waveguides further comprise a third optical waveguide, wherein the third optical waveguide, the first optical waveguide, and the second optical waveguide each are located at a different layer of the optical waveguide structure, a second optical waveguide channel is disposed between the third optical waveguide and the second optical waveguide, a first end of the second optical waveguide channel is physically connected to the second optical waveguide and a second end of the second optical waveguide channel is physically connected to the third optical waveguide.

7. The optical waveguide structure according to claim 1, wherein a thickness of a gap between the first optical waveguide and the second optical waveguide ranges from 500 nm to 5 µm.

8. The optical waveguide structure according to claim 1, wherein a length or a width of a cross section of the first optical waveguide channel ranges from 500 nm to 5 µm, and the cross section is perpendicular to the stacking direction of the first optical waveguide and the second optical waveguide.

9. The optical waveguide structure according to claim 1, wherein an angle formed between an extension direction of the first optical waveguide channel and a plane on which any connected optical waveguide is located ranges from 45° to 135°.

10. The optical waveguide structure according to claim 1, wherein a difference between a refractive index of the first optical waveguide channel and a refractive index of the second optical waveguide ranges from 0.5% to 50%.

11. An optical waveguide module, comprising:
a multiplexer/demultiplexer;
a first tributary wave add/drop structure;
a connector; and
at least two optical waveguide structures, wherein each optical waveguide structure comprises:
at least two optical waveguides disposed in a stacked manner, wherein the at least two optical waveguides comprise a first optical waveguide and a second optical waveguide, and the first optical waveguide and the second optical waveguide are located at different layers of the corresponding optical waveguide structure; and
a first optical waveguide channel disposed between the first optical waveguide and the second optical waveguide, wherein a first end of the first optical waveguide channel is physically connected to the first optical waveguide and a second end of the first optical waveguide channel is physically connected to the second optical waveguide;
wherein the multiplexer/demultiplexer comprises a line port and at least two first optical waveguide connection ports, and the at least two first optical waveguide connection ports of the multiplexer/demultiplexer are one-to-one connected to first ends of first optical waveguides of the at least two optical waveguide structures;
wherein the first tributary wave add/drop structure comprises a first tributary port and at least two second optical waveguide connection ports, the at least two second optical waveguide connection ports of the first tributary wave add/drop structure are one-to-one connected to second ends of the first optical waveguides of the at least two optical waveguide structures, and the first tributary port is configured to upload or download an optical signal; and
wherein the connector comprises a line pass-through port and at least two third optical waveguide connection ports, the at least two third optical waveguide connection ports of the connector each are connected to a second end of a second optical waveguide of each of the at least two optical waveguide structures, the line pass-through port is configured to be connected to a line pass-through port of another optical waveguide module, and a quantity of first optical waveguide connection ports, a quantity of second optical waveguide connection ports, and a quantity of third optical waveguide connection ports are all the same as a quantity of optical waveguide structures.

12. The optical waveguide module according to claim 11, wherein each optical waveguide structure further comprises n fourth optical waveguides, the n fourth optical waveguides and the first optical waveguide of each optical waveguide structure are located at different layers of the corresponding optical waveguide structure, and each optical waveguide structure further comprises a third optical waveguide channel disposed between the first optical waveguide and each fourth optical waveguide of the corresponding optical waveguide structure, and in each optical waveguide structure, a first end of the third optical waveguide channel of the optical waveguide structure is connected to the first optical waveguide of the optical waveguide structure, a second end of the third optical waveguide channel of the optical waveguide structure is connected to a first end of the fourth optical waveguide of the optical waveguide structure, and wherein n is a positive integer.

13. The optical waveguide module according to claim 12, further comprising:
m second tributary wave add/drop structures, wherein each second tributary wave add/drop structure has a second tributary port and a fourth optical waveguide connection port, the fourth optical waveguide connection ports of the m second tributary wave add/drop structures each are connected to a second end of a fourth optical waveguide of each of the at least two optical waveguide structures, the second tributary port is configured to upload or download an optical signal, and a quantity of fourth optical waveguide connection ports is the same as the quantity of optical waveguide structures.

14. The optical waveguide module according to claim 13, wherein the first tributary wave add/drop structure or a first second tributary wave add/drop structure of the m second tributary wave add/drop structures is a cascaded optical switch structure having $2^N$ first ports and one second port, wherein N is a positive integer; and
wherein each tributary wave add/drop structure is configured to: after receiving a logic control instruction, control, based on the logic control instruction, the second port to connect to one of the $2^N$ first ports, and disconnect from another first port.

15. The optical waveguide module according to claim 12, wherein in each optical waveguide structure, an extension direction of the first optical waveguide of the optical waveguide structure is perpendicular to an extension direction of the second optical waveguide of the optical waveguide structure, and is parallel to extension directions of the n fourth optical waveguides of the optical waveguide structure.

16. The optical waveguide module according to claim 11, wherein each of the at least two optical waveguide structures further comprises:
 a dielectric layer disposed between the first optical waveguide and the second optical waveguide in a stacking direction of the first optical waveguide and the second optical waveguide, wherein the first optical waveguide channel is in the dielectric layer, and a refractive index of the dielectric layer is less than a refractive index of the first optical waveguide channel.

17. The optical waveguide module according to claim 11, wherein the first optical waveguide of each optical waveguide structure is located at an upper layer of the second optical waveguide of each optical waveguide structure, and each optical waveguide structure further comprises:
 an optical switch connected to the first optical waveguide, wherein the optical switch is configured to perform routing of an optical signal in a manner that the optical signal is transmitted along the first optical waveguide or transmitted along the second optical waveguide.

18. The optical waveguide module according to claim 11, wherein in each optical waveguide structure, in the stacking direction of the first optical waveguide and the second optical waveguide, projections of a first region of the first optical waveguide and a second region of the second optical waveguide overlap on a plane parallel to the first optical waveguide and the second optical waveguide, and the first optical waveguide channel connects the first region and the second region.

19. An optical switching device, comprising:
 a communication structure, comprising two optical waveguide modules, wherein each optical waveguide module comprises:
  a multiplexer/demultiplexer;
  a first tributary wave add/drop structure;
  a connector; and
  at least two optical waveguide structures;
 wherein each optical waveguide structure of the at least two optical waveguide structures comprises:
  at least two optical waveguides disposed in a stacked manner, wherein the at least two optical waveguides comprise a first optical waveguide and a second optical waveguide, and the first optical waveguide and the second optical waveguide are located at different layers of the corresponding optical waveguide structure; and
  a first optical waveguide channel disposed between the first optical waveguide and the second optical waveguide of the corresponding optical waveguide structure, wherein a first end of the first optical waveguide channel is physically connected to the first optical waveguide and a second end of the first optical waveguide channel is physically connected to the second optical waveguide;

wherein each multiplexer/demultiplexer comprises a line port and at least two first optical waveguide connection ports, and the at least two first optical waveguide connection ports of the corresponding multiplexer/demultiplexer are one-to-one connected to first ends of first optical waveguides of the at least two optical waveguide structures of the corresponding optical module;

wherein each first tributary wave add/drop structure comprises a first tributary port and at least two second optical waveguide connection ports, the at least two second optical waveguide connection ports of each first tributary wave add/drop structure are one-to-one connected to second ends of the first optical waveguides of the at least two optical waveguide structures of the corresponding optical module, and each first tributary port is configured to upload or download an optical signal; and wherein each connector comprises a line pass-through port and at least two third optical waveguide connection ports, the at least two third optical waveguide connection ports of each connector each are connected to a second end of a second optical waveguide of each of the at least two optical waveguide structures, the line pass-through port is configured to be connected to a line pass-through port of another optical waveguide module, and a quantity of first optical waveguide connection ports, a quantity of second optical waveguide connection ports, and a quantity of third optical waveguide connection ports are all the same as a quantity of optical waveguide structures;

wherein the two optical waveguide modules are connected through respective line pass-through ports, and the line ports of the two optical waveguide modules each are connected to a line in a different direction.

20. The optical switching device according to claim 19, wherein the optical switching device comprises two communication structures, and optical signal transmission directions of lines connected to line ports of the two communication structures are opposite.

* * * * *